United States Patent
Ikeda et al.

(10) Patent No.: US 8,753,210 B2
(45) Date of Patent: Jun. 17, 2014

(54) GAME SYSTEM AND CONTROLLER

(71) Applicant: Nintendo Co., Ltd., Kyoto (JP)

(72) Inventors: Akio Ikeda, Kyoto (JP); Naoto Kobe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/740,513

(22) Filed: Jan. 14, 2013

(65) Prior Publication Data
US 2013/0130793 A1 May 23, 2013

Related U.S. Application Data

(63) Continuation of application No. 12/565,203, filed on Sep. 23, 2009.

(30) Foreign Application Priority Data

Jul. 24, 2009 (JP) ................................ 2009-173456
Jul. 24, 2009 (JP) ................................ 2009-173457

(51) Int. Cl.
*G07F 17/32* (2006.01)
(52) U.S. Cl.
USPC .......................................................... 463/42
(58) Field of Classification Search
USPC .......................................................... 463/42
See application file for complete search history.

(56) References Cited

U.S. PATENT DOCUMENTS

| 5,605,505 | A | 2/1997 | Han |
| RE35,786 | E | 5/1998 | Ohara |
| 5,759,100 | A | 6/1998 | Nakanishi |
| 6,511,378 | B1 | 1/2003 | Bhatt et al. |
| 6,524,188 | B2 | 2/2003 | Wang |
| 6,540,614 | B1 | 4/2003 | Nishino et al. |
| 6,773,349 | B2 | 8/2004 | Hussaini et al. |

(Continued)

FOREIGN PATENT DOCUMENTS

JP     2000-157719 A     6/2000

OTHER PUBLICATIONS

Wii Sports Intruction Booklet, Copyright 2006 Nintendo of America, Inc.*

(Continued)

*Primary Examiner* — Pierre E Elisca
(74) *Attorney, Agent, or Firm* — Nixon & Vanderhye P.C.

(57) ABSTRACT

A game system is provided in which a plurality of pairs, each consisting of: a first input device provided with a first operation section; and a second input device provided with a second operation section, are wirelessly connected to a game apparatus, and in which a game process is executed based on operation data obtained from the first input device and the second input device. As an example, each of the first input device and the second input device includes a display section, wireless communication means for performing communication for the operation data and information regarding each pair, and a display control section for controlling a display form of the display section. The display control section controls the display form of the display section so as to be a display form corresponding to each pair. The game apparatus executes the game process based on the operation data for each pair.

11 Claims, 27 Drawing Sheets

(56) References Cited

U.S. PATENT DOCUMENTS

| | | |
|---|---|---|
| 7,412,348 B2 | 8/2008 | Okamura |
| 7,480,492 B2 | 1/2009 | Williams et al. |
| 7,775,884 B1 | 8/2010 | McCauley |
| 8,038,533 B2 | 10/2011 | Tsuchiyama et al. |
| 8,624,960 B2 * | 1/2014 | Unkel et al. ............ 348/46 |
| 2001/0029203 A1 | 10/2001 | Shoji et al. |
| 2004/0023719 A1 | 2/2004 | Hussaini et al. |
| 2005/0054450 A1 * | 3/2005 | Yamaguchi ............ 463/58 |
| 2005/0170889 A1 | 8/2005 | Lum et al. |
| 2007/0049374 A1 | 3/2007 | Ikeda et al. |
| 2008/0076567 A1 * | 3/2008 | Dohta ............ 463/37 |
| 2008/0318679 A1 | 12/2008 | Tran et al. |
| 2009/0005164 A1 | 1/2009 | Chang |
| 2009/0124381 A1 | 5/2009 | Quillen, III |
| 2010/0311501 A1 | 12/2010 | Hsu |
| 2012/0026157 A1 * | 2/2012 | Unkel et al. ............ 345/419 |
| 2012/0069131 A1 * | 3/2012 | Abelow ............ 348/14.01 |
| 2014/0003611 A1 * | 1/2014 | Mohammad et al. ............ 381/66 |
| 2014/0085437 A1 * | 3/2014 | Unkel et al. ............ 348/54 |

OTHER PUBLICATIONS

Writer, Tall, Golds Gym Cardio Workout game as evidenced by the game review downloaded from http://web.archive.org/web/20090511090716/http://blogcritics.org/gaming/article/nintendo-wii-review-golds-gym-cardio/ with an archive.org verified date of May 11, 2009.

Resident Evil 4, Wii Edition, Capcom Entertainment, as evidenced by the manual downloaded from www.replacementdocs.com with a replacementdocs.com upload date of Jun. 29, 2007.

Sauter, Mobile Society blog entry "Wireless Moves", downloaded from http://web.archive.org/web/20090511021308/http://mobilesociety.typepad.com/mobile_life/bluetooth/ with an archive.org verified date of May 11, 2009.

Wii Operations Manual, Nintendo of America, 2006, which can be found at http://www.gamepro.com/article/news/86488/fullnintendo-wii-manual-uploaded/with a date of Nov. 14, 2006 or www.nintendo.com/consu mer/downloads/WiiCh_Eng.pdf.

"The Wii Controller", the extension controller, and the nunchuk in the web page of URL: http://www.nintendo.co.jp/wii/controllers/index.html, Nintendo Co., Ltd., searched on Jun. 22, 2009, 3 pages.

* cited by examiner

F I G. 8
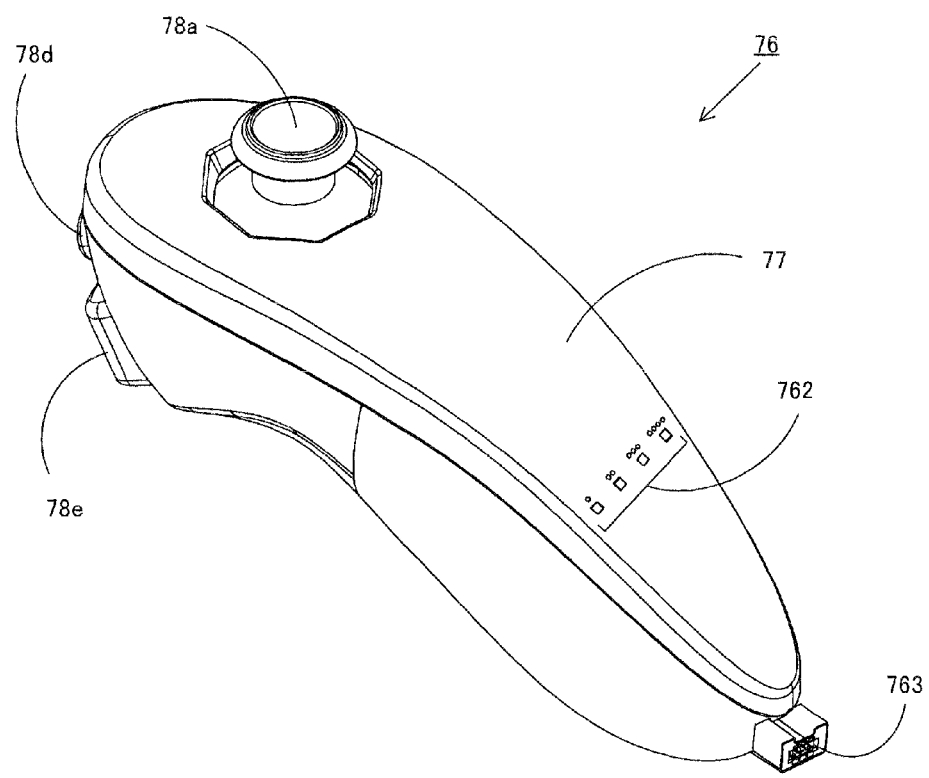

F I G. 17
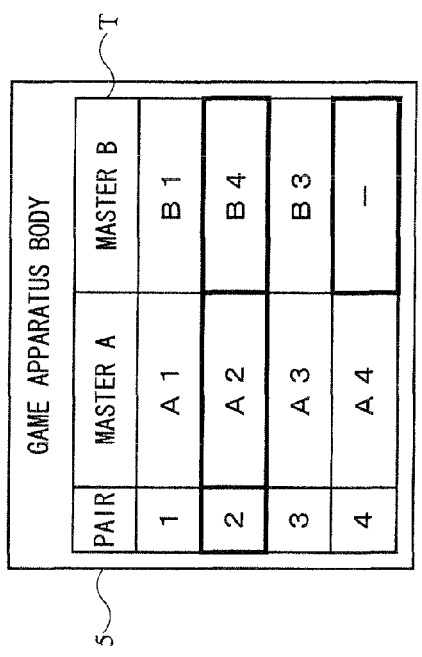
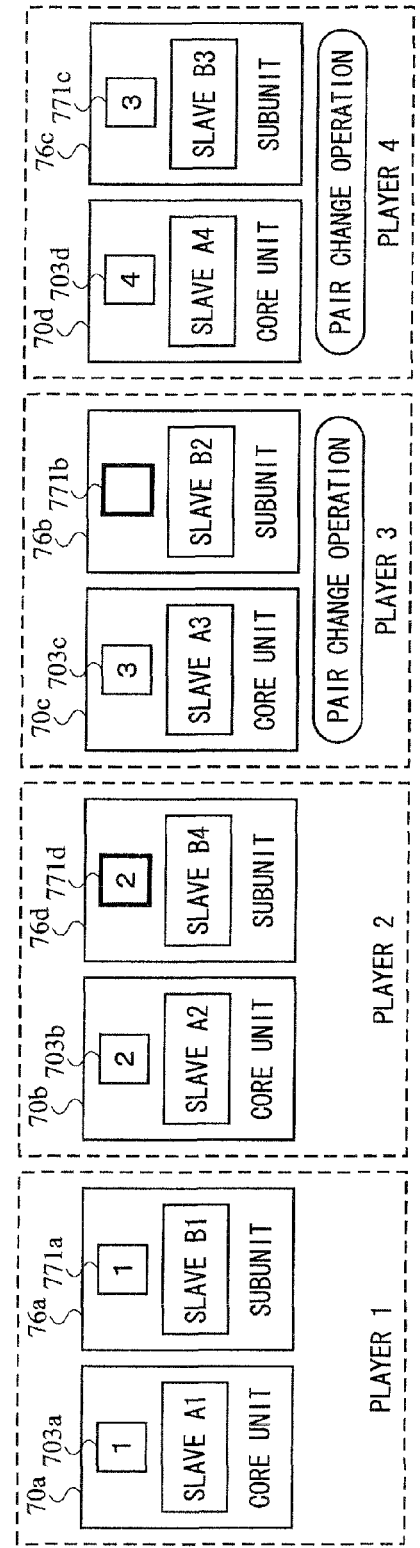

|  | ID NUMBER | SLAVE NUMBER | PAIR NUMBER | PAIR ID NUMBER |
|---|---|---|---|---|
| MASTER A | AXXXXXX | A1 | 1 | axxxxxx |
|  | BXXXXXX | A2 | 2 | bxxxxxx |
|  | CXXXXXX | A3 | 3 | cxxxxxx |
|  | DXXXXXX | A4 | 4 | dxxxxxx |

Dc

F I G. 28
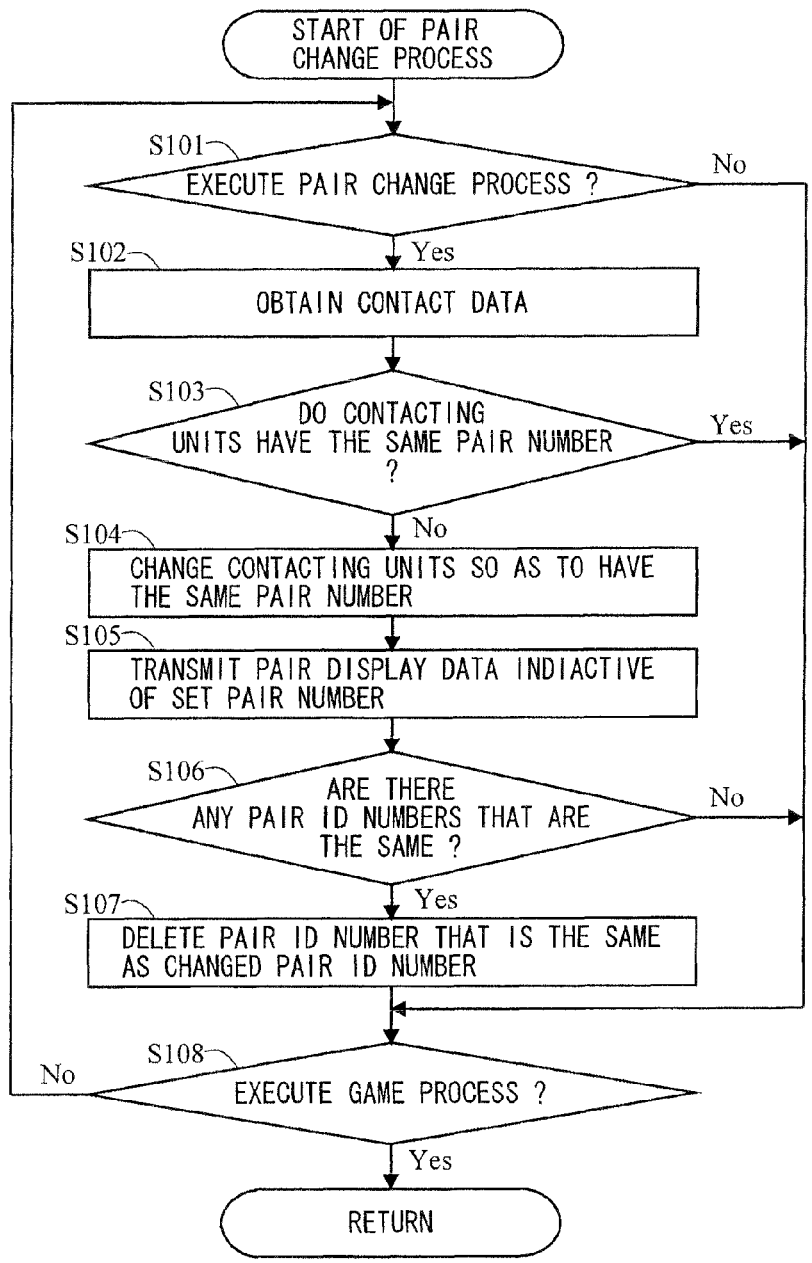

GAME SYSTEM AND CONTROLLER

CROSS-REFERENCES TO RELATED APPLICATIONS

This application is a continuation of U.S. Ser. No. 12/565,203, filed Sep. 23, 2009, which claims priority to Japanese Patent Application Nos. 2009-173456 and 2009-173457, filed on Jul. 24, 2009, each of which is incorporated herein in its entirety.

BACKGROUND AND SUMMARY

1. Technical Field

The technology presented herein relates to a game system and a controller, and more particularly, to a game system and a controller which move, based on a direction input, an object displayed on a display device.

2. Description of the Background Art

Conventionally, for example, a controller including control units that are held by both hands of a player to perform a game operation is disclosed at the "Wii controller", the extension controller, and the nunchuk in the web page of URL: http://www.nintendo.co.jp/wii/controllers/index.html, Nintendo Co., Ltd., searched on Jun. 22, 2009 (hereinafter, referred to as Non-Patent Document 1).

The controller disclosed in Non-Patent Document 1 is composed of a first control unit and a second control unit that is connected to an external extension connector of the first control unit via a connection cable. Then, a player holds the first control unit with one hand (e.g. the right hand) and the second control unit with the other hand (e.g. the left hand), and performs a game operation. Here, each of the first control unit and the second control unit is provided with operation buttons, a stick, and the like on a top surface and a side surface of a housing thereof.

However, in the controller disclosed in the above Non-Patent Document 1, because the first control unit and the second control unit are connected to each other via the connection cable, a range in which the player holding the controller to perform a game operation can freely move the first control unit and the second control unit is limited. Further, when a plurality of players perform game operations by using the above controllers in a state where there are no connection cables, each pair of a first control unit and a second control unit is difficult to be identified, and thus there is the possibility that the players use wrong pairs of first control units and second control units. Further, when a player performs an operation by using a first control unit and a second control unit that belong to different pairs, it becomes impossible for the player to perform an intended operation.

SUMMARY

Therefore, a feature of the example embodiments presented herein is to provide a game system and a controller, which, when the controller including two completely separate units is used, make it possible to identify a combination of the units. Further, another feature of the present embodiment is to provide a game system and a controller, which, when the controller including two completely separate units is used, make it possible to change a combination of the units that are connected to a game apparatus.

The present embodiment has the following features to attain the above.

A first aspect of the present embodiment is a game system in which a plurality of pairs, each consisting of: a first input device provided with a first operation section; and a second input device provided with a second operation section, are wirelessly connected to a game apparatus, and in which a game process is executed based on operation data obtained from the first input device and the second input device. Each of the first input device and the second input device includes a display section, wireless communication means, and a display control section. The wireless communication means wirelessly communicates the operation data and information regarding each pair. The display control section controls a display form of the display section. The game apparatus executes the game process based on the operation data for each pair.

According to the above, the display section for identifying a combination of a first input device and a second input device is provided in each input device. Then, the combination of the first input device and the second input device is appropriately displayed on the display section, and thus it is possible to identify a combination in the case of using controllers each including a first input device and a second input device that are completely separated from each other.

Further, the wireless communication means of the first input device may wirelessly transmit, to the second input device that belongs to the same pair as the first input device, first operation data in accordance with an operation with respect to the first operation section. The wireless communication means of the second input device may wirelessly transmit, to the game apparatus, second operation data in accordance with an operation with respect to the second operation section, together with the first operation data received from the first input device that belongs to the same pair as the second input device.

According to the above, even in a communication system in which: operation data outputted from one of input devices is wirelessly transmitted to the other input device; and the other input device wirelessly transmits, to a game apparatus, the operation data outputted from the one of the input devices, together with operation data outputted from the other input device, it is possible to identify a combination in the case of using controllers each including a first input device and a second input device that are completely separated from each other.

Further, the wireless communication means of the first input device may wirelessly transmit, to the game apparatus, first operation data in accordance with an operation with respect to the first operation section. The wireless communication means of the second input device may wirelessly transmit, to the game apparatus, second operation data in accordance with an operation with respect to the second operation section.

According to the above, even in a communication system in which operation data outputted from both of input devices is wirelessly transmitted to a game apparatus, it is possible to identify a combination in the case of using controllers each including a first input device and a second input device that are completely separated from each other.

Further, the display control section may control the display form of the display section of the corresponding input device, such that the same color is displayed on the display section of each of the first input device and the second input device that belong to the same pair.

According to the above, it is possible to identify a combination by the color displayed on the display section of each of the first input device and the second input device.

Further, each display section may be a multicolor LED.

According to the above, because the display section of each of the first input device and the second input device is composed of a plurality of multicolor LEDs, it is possible to express various colors.

Further, the display control section may control the display form of the display section of the corresponding input device, such that the same numeral, the same symbol, the same letter, or the same image is displayed on the display section of each of the first input device and the second input device that belong to the same pair.

According to the above, it is possible to identify a combination by the numeral, symbol, letter, or image that is displayed on the display section of each of the first input device and the second input device.

Further, each display section may be a seven-segment display.

According to the above, because the display section of each of the first input device and the second input device is composed of a seven-segment display, it is possible to express various numerals, symbols, or letters.

Further, each display section may be a plurality of LEDs. In this case, each display control section may control lighting of the LEDs of the corresponding input device, such that LEDs that are positioned at the same location in the first input device and the second input device, among the plurality of LEDs provided in each of the first input device and the second input device that belong to the same pair, are lit up.

According to the above, it is possible to identify a combination by the location of the lit LED of each of the second input device and the first input device.

Further, when the corresponding input device does not belong to any one of the pairs, the display control section controls the display section so as to perform a display in a display form different from the display form corresponding to each pair.

According to the above, it is possible to recognize that the first input device or the second input device does not belong to any pair.

Further, the game apparatus: may administrate the first input device and the second input device that belong to each of the plurality of pairs, based on the information regarding the pair that is transmitted wirelessly from the first input device and/or the second input device; and may wirelessly transmit, to the first input device and/or the second input device, data indicative of the pair to which each of the first input device and the second input device belongs. In this case, the display control section may control the display section so as to perform a display in a display form corresponding to the pair indicated by the received data indicative of the pair.

According to the above, because the game apparatus controls grouping, it is possible to perform displays for combinations that are different from each other.

Further, a second aspect of the present embodiment may be implemented in the form of a controller constituting a part of the above game system.

According to the aforementioned present embodiment, a display section for identifying a combination of the first input device (first unit) and the second input device (second unit) is provided in each input device (each unit). Then, because the combination of the first input device (first unit) and the second input device (second unit) is appropriately displayed on the display section, it is possible to identify a combination in the case of using controllers each including a first input device (first unit) and a second input device (second unit) that are completely separated from each other.

A third aspect of the present embodiment is a game system in which a plurality of pairs, each consisting of: a first input device provided with a first operation section; and a second input device provided with a second operation section, are wirelessly connected to a game apparatus, and in which a game process is executed based on operation data obtained from the first input device and the second input device. Each of the first input device and the second input device includes wireless communication means and detection means. The wireless communication means wirelessly communicates the operation data and information regarding each pair. The detection means detects that a predetermined operation is performed by a user with respect to the first input device and the second input device. Specifically, the detection means detects a predetermined operation that is normally assumed to be performed by the same user. The game system comprises control means. The control means controls a combination of the first input device and the second input device in each pair in accordance with a detection result by the detection means.

The detection means includes an example of detecting that the first input device and the second input device are operated by the same user, for example, by the following methods, but the example is merely an example in every respect and is not intended to limit the scope of the detection means. As a first example, by detecting that predetermined terminals respectively provided in the first input device and the second input device are connected to each other, the first input device and the second input device can be determined to be operated by the same user. As a second example, by detecting that near-field wireless communication (e.g. NFC) between the first input device and the second input device is enabled, the first input device and the second input device can be determined to be operated by the same user. In both of the examples, an operation of the same user: holding the first input device and the second input device with left and right hands; and causing the input devices to be connected to each other or approach each other, is performed. By determining that this operation is performed by the same operation, it is possible to change settings such that the first input device and the second input device currently held by the user are paired to be used for a game, by a simple operation. As a third example, when it is detected that human body communication between the first input device and the second input device is enabled, it is possible to detect that the first input device and the second input device are operated by the same user. According to this example, the user only holds input devices for a game, whereby the user can play the game using the combination. As a fourth example, by detecting that predetermined operation buttons respectively provided in the first input device and the second input device are pressed within a predetermined time period, the first input device and the second input device can be determined to be operated by the same user. According to this, because an operation of pressing each button within the predetermined time period needs to be performed, the operation can be determined to be performed by the same user for the purpose of changing a combination.

According to the above, it is possible to change a combination of the first input device and the second input device that are connected to the game apparatus.

Further, the detection means may detect that predetermined terminals respectively provided in the first input device and the second input device are connected to each other.

According to the above, by the user connecting the predetermined terminal of the first input device to the predetermined terminal of the second input device, a combination of the first input device and the second input device that can be determined to be operated by the user can be detected.

Further, each of the first input device and the second input device may also include an NFC chip. In this case, each detection means may detect that near-field wireless communication is enabled between the NFC chip of the first input device and the NFC chip of the second input device.

According to the above, by the user causing the first input device and the second input device to get close to each other, a combination of the first input device and the second input device that can be determined to be operated by the user can be detected.

Further, each of the first input device and the second input device may also include human body communication means for performing communication with another input device via the body of a user. In this case, each detection means may detect that the first input device and the second input device are operated by the same user, by human body communication being enabled between the human body communication means of the first input device and the human body communication means of the second input device.

According to the above, by the user holding the first input device and the second input device, a combination of the first input device and the second input device that are operated by the user can be detected.

Further, the detection means may detect that predetermined operation buttons respectively provided in the first input device and the second input device are pressed within a predetermined time period.

According to the above, by the user pressing the predetermined operation button of the first input device and the predetermined operation button of the second input device within the predetermined time period, a combination of the first input device and the second input device that can be determined to be operated by the user can be detected.

Further, the wireless communication means of the first input device may wirelessly transmit, to the second input device that belongs to the same pair as the first input device, first operation data in accordance with an operation with respect to the first operation section. The wireless communication means of the second input device may wirelessly transmit, to the game apparatus, second operation data in accordance with an operation with respect to the second operation section and information regarding the pair, together with the first operation data received from the first input device that belongs to the same pair as the second input device.

According to the above, even in a communication system in which: operation data outputted from one of input devices is wirelessly transmitted to the other input device; and the other input device wirelessly transmits, to a game apparatus, operation data outputted form the one of the input devices, together with operation data outputted from the other input device, it is possible to change a combination of the first input device and the second input device that are connected to the game apparatus.

Further, when the detection means detects that a predetermined operation is performed by the same user with respect to the first input device and the second input device, the control means may set the first input device and the second input device, with respect to which it is detected that the predetermined operation is performed by the same user, to belong to the same pair connected to the game apparatus. In this case, the wireless communication means of the first input device may set the second input device, which is set by the control means to belong to the same pair as the first input device, to be a destination for wireless transmission of the first operation data.

According to the above, it is possible to control, in accordance with a pair that is set by the control means, the first input device and the second input device that perform wireless communication.

Further, the wireless communication means of the first input device may wirelessly transmit, to the game apparatus, first operation data in accordance with an operation with respect to the first operation section and information regarding the pair. In this case, the wireless communication means of the second input device may wirelessly transmit, to the game apparatus, second operation data in accordance with an operation with respect to the second operation section and information regarding the pair.

According to the above, in a communication system in which operation data outputted from both of input devices is wirelessly transmitted to a game apparatus, it is possible to change a combination of the first input device and the second input device that are connected to the game apparatus.

Further, the game apparatus may also include combination storage means. The storage means stores combination information indicative of a combination of the first input device and the second input device. When the detection means detects that a predetermined operation is performed by the same user with respect to the first input device and the second input device, the combination storage means may update the combination information such that the first input device and the second input device, with respect to which it is detected that the predetermined operation is performed by the same user, belong to the same combination; and when one of the first input device and the second input device, with respect to which it is detected that the predetermined operation is performed by the same user, has been paired with another input device, the combination storage means may update the combination information so as to cancel a combination of: the one of the first input device and the second input device; and the another input device.

According to the above, it is possible to appropriately administrate, in accordance with the combination information that is stored in the game apparatus, a combination of the first input device and the second input device that are connected to the game apparatus.

Further, each of the first input device and the second input device may also include a display section and a display control section. The display control section controls a display form of the display section. In this case, the display control section may control the display form of the display section so as to be a display form corresponding to the combination controlled by the control means. Further, the game apparatus executes the game process based the operation data for each combination.

According to the above, the display section for identifying a combination of the first input device and the second input device is provided in each input device. Then, the combination of the first input device and the second input device is appropriately displayed on the display section, and thus it is possible to identify a combination in the case of using controllers each including a first input device and a second input device that are completely separated from each other.

Further, a fourth aspect of the present embodiment may be implemented in the form of a controller constituting a part of the above game system.

Further, according to the aforementioned present embodiment, when a controller including a first input device (first unit) and a second input device (second unit) that are completely separated from each other is used, it is possible to change a combination of the input devices (units) connected to the game apparatus.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 8 is a perspective view showing an example of a subunit 76 in FIG. 3;

FIG. 17 illustrates a second stage of the example of the pair change process executed by the game apparatus body 5 in FIG. 1;

FIG. 28 is a subroutine showing another example of detailed operations of the pair change process at step 43 in FIG. 21.

DESCRIPTION OF THE PREFERRED EMBODIMENTS

First Embodiment

Figure 1:
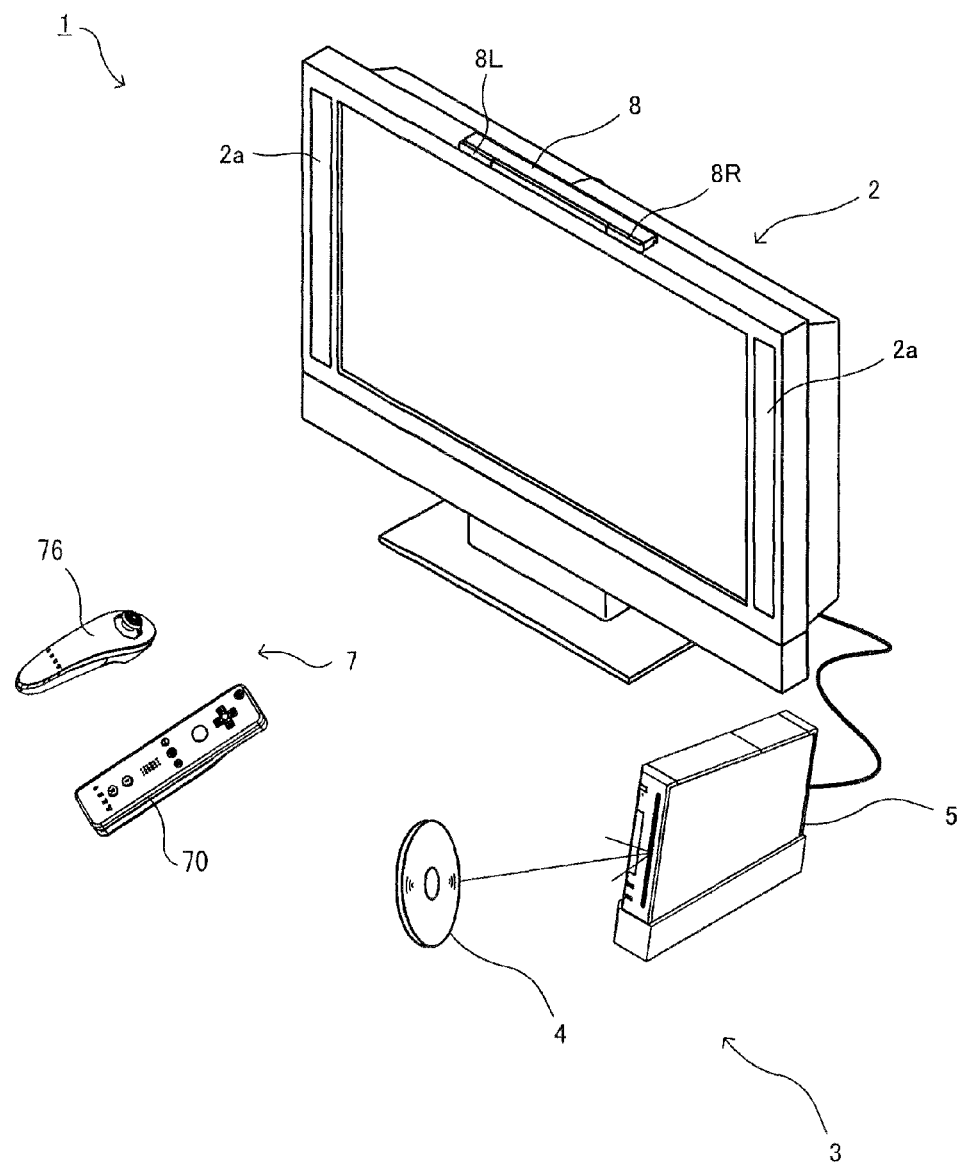
FIG. 1 is an external view showing an example of a game system 1 according to an embodiment.
Figure 2:
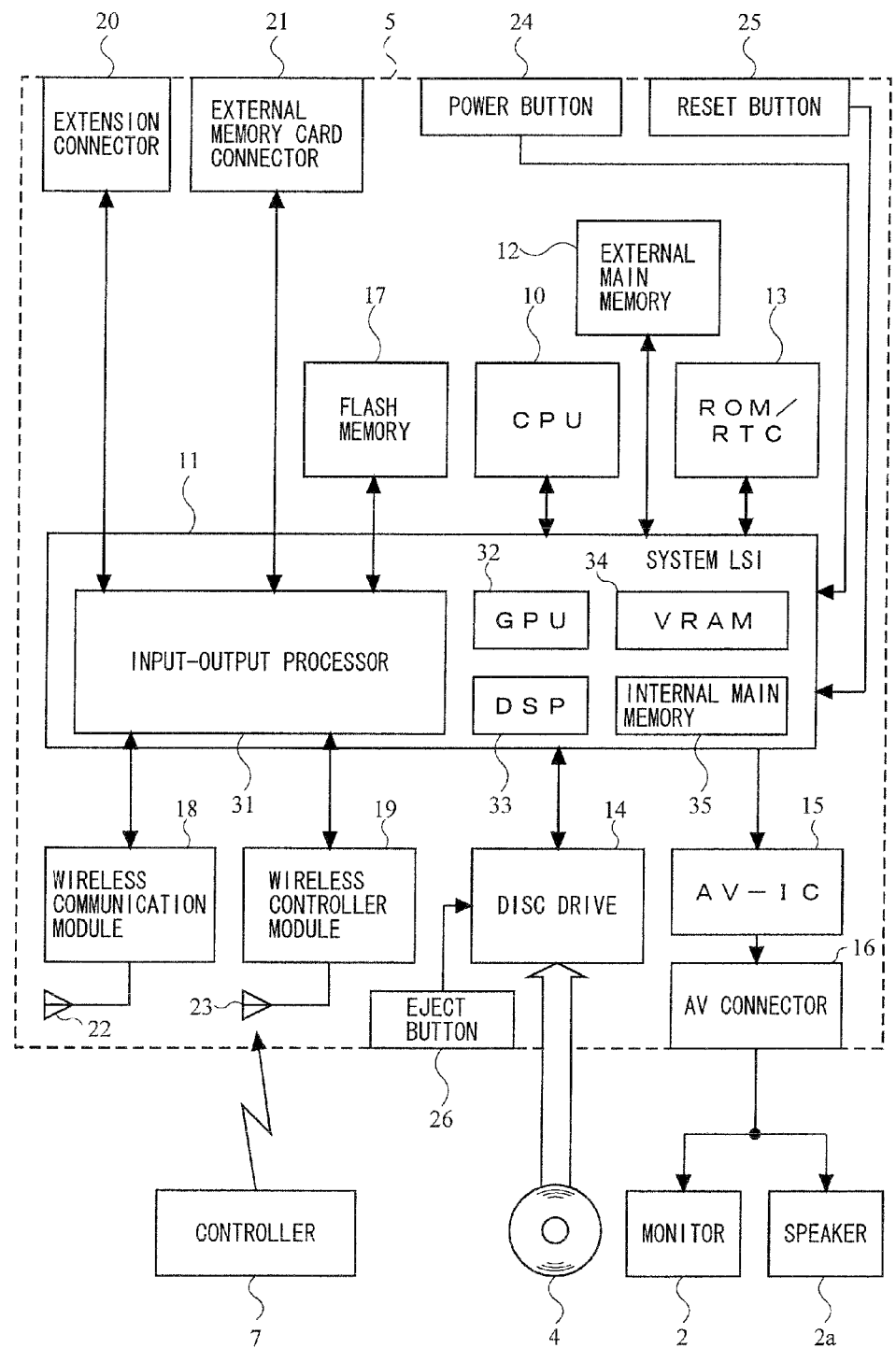
FIG. 2 is a functional block diagram showing an example of a game apparatus body 5 in FIG. 1.

With reference to FIGS. 1 and 2, a game system according to a first embodiment, including an apparatus for executing a game program, will be described. Hereinafter, in order to give a specific description, a game apparatus 3 including a stationary game apparatus body 5 will be described as an example of the game system. FIG. 1 is an external view of an example of a game system 1 including the stationary game apparatus 3, and FIG. 2 is a block diagram showing an example of the game apparatus body 5. The following will describe the game system 1.

Referring to FIG. 1, the game system 1 includes a home-use television receiver (hereinafter, referred to as monitor) 2 as an example of display means, and the stationary game apparatus 3 that is connected to the monitor 2 via a connecting cord. The monitor 2 includes a pair of speakers 2a for audio-outputting audio signals outputted from the game apparatus body 5. The game apparatus 3 includes an optical disc 4 storing a game program, the game apparatus body 5 provided with a computer for executing the game program in the optical disc 4 to display a game screen on the monitor 2, and a controller 7 for providing the game apparatus body 5 with operation information that is required for a game in which a character and the like displayed on the game screen is controlled.

The game apparatus body 5 includes a wireless controller module 19 (see FIG. 2). The wireless controller module 19 receives data transmitted wirelessly from the controller 7, and transmits data from the game apparatus body 5 to the controller 7, so that the controller 7 and the game apparatus main body 5 are connected to each other by wireless communication. Further, the optical disc 4 as an example of an exchangeable information storage medium is detachably mounted to the game apparatus body 5.

The game apparatus body 5 includes a flash memory 17 (see FIG. 2) that functions as a backup memory to store data such as saved data, and the like in a fixed manner. The game apparatus body 5 executes the game program and the like stored in the optical disc 4, and displays the result as a game image on the monitor 2. The game program and the like may be stored in advance in the flash memory 17 instead of the optical disc 4, and executed. Further, the game apparatus body 5 reproduces a game state, which has been executed previously, by using saved data stored in the flash memory 17, and displays a game image on the monitor 2. A player of the game apparatus body 5 operates the controller 7 while watching a game image displayed on the monitor 2, and enjoys a progress of a game.

By using the technology of, for example, Bluetooth (registered trademark), the controller 7 wirelessly transmits transmission data, such as the operation information and the like, to the game apparatus body 5 including the wireless controller module 19. The controller 7 includes two separate control units (a core unit 70 and a subunit 76), and is an operation means mainly for operating an object and the like displayed on the display screen of the monitor 2. Each of the core unit 70 and the subunit 76 includes a housing whose size is small enough to be held by one hand; and a plurality of operation buttons (a cross key, a stick, and the like) that are provided on surfaces of the housing. As described later, the core unit 70 includes an imaging information calculation section 74 for taking an image viewed from the core unit 70. As an example of targets whose images are to be taken by the imaging information calculation section 74, two LED modules (hereinafter, referred to as markers) 8L and 8R are provided in the vicinity of the display screen of the monitor 2. The markers 8L and 8R each emit infrared light forward from the monitor 2. Further, the core unit 70 also receives at a communication section 75 transmission data transmitted wirelessly from the wireless controller module 19 of the game apparatus body 5, and produces sound and vibration in accordance with the transmission data.

In the present embodiment, each of the core unit 70 and the subunit 76 is provided with a wireless unit, and there is no connection cable provided between the core unit 70 and the subunit 76. For example, each of the core unit 70 and the subunit 76 is provided with a Bluetooth (registered trademark) unit as the wireless unit, whereby each of the core unit 70 and the subunit 76 wirelessly transmits operation data to the game apparatus body 5. As a first example, each of the core unit 70 and the subunit 76 wirelessly transmits operation data directly to the game apparatus body 5. As a second example, the subunit 76 wirelessly transmits, to the core unit 70, operation data generated in the subunit 76. Then, the core unit 70 wirelessly transmits, to the game apparatus body 5, data generated in the core unit 70, together with the operation data transmitted from the subunit 76. As a third example, the core unit 70 wirelessly transmits, to the subunit 76, operation data generated in the core unit 70. Then, the subunit 76 wirelessly transmits, to the game apparatus body 5, data generated in the subunit 76, together with the operation data transmitted from the core unit 70.

The following will describe an internal configuration of the game apparatus body 5 with reference to FIG. 2. The game apparatus body 5 includes a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 executes game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as: control of data transfer between the system LSI 11 and each component connected to the system LSI 11; generation of an image to be displayed; obtaining data from an external apparatus; and the like. An internal configuration of the system LSI 11 will be described later. The volatile external main memory 12 stores various data and programs such as the game program read from the optical disc 4; a game program read from a flash memory 17; and the like, and is used as a work area and a buffer area for the CPU 10. The ROM/RTC 13 includes a ROM (so-called boot ROM) that stores a program for starting up the game apparatus body 5, and a clock circuit (RTC) for counting time. The disc drive 14 reads program data and texture data from the optical disc 4, and writes these data into a later-described internal main memory 35 or the external main memory 12.

The system LSI 11 is provided with an input-output processor 31, a GPU (Graphics Processor Unit) 32, a DSP (Digital Signal Processor) 33, a VRAM 34, and the internal main memory 35. Although not shown in the drawings, these components 31 to 35 are connected to each other via an internal bus.

The GPU 32 forms a part of drawing means, and generates an image according to a graphics command (command for generating graphics) from the CPU 10. The VRAM 34 stores data (data such as polygon data, texture data, and the like) that are required for the GPU 32 to execute the graphics command. In generating an image, the GPU 32 generates the image data by using the data stored in the VRAM 34.

The DSP 33 functions as an audio processor, and generates audio data by using sound data and sound waveform (tone color) data that are stored in the internal main memory 35 and the external main memory 12.

The image data and the sound data generated thus are read by the AV-IC 15. The AV-IC 15 outputs the image data to the television 2 via an AV connector 16, and the sound data to the speakers 2a provided in the television 2. Thus, an image is displayed on the television 2, and sound is outputted from the speakers 2a.

The input-output processor (I/O processor) 31 performs transmission and reception of data to and from each component connected to the input-output processor 31, and downloads data from an external apparatus. The input-output processor 31 is connected to the flash memory 17, a wireless communication module 18, a wireless controller module 19, an extension connector 20, and an external memory card connector 21. An antenna 22 is connected to the wireless communication module 18, and an antenna 23 is connected to the wireless controller module 19.

The input-output processor 31 is connected to a network via the wireless communication module 18 and the antenna 22, so that the input-output processor 31 is communicable with another game apparatus connected to the network and various servers connected to the network. The input-output processor 31 periodically accesses the flash memory 17 to detect whether there is data required to be transmitted to the network. If there is such data, the input-output processor 31 transmits the data to the network via the wireless communication module 18 and the antenna 22. The input-output processor 31 receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus body 5 and the other game apparatus and various servers, the flash memory 17 may store saved data (result data or midstream data of the game) of the game played using the game apparatus body 5.

The input-output processor 31 receives operation data transmitted from the controller 7 via the antenna 23 and the wireless controller module 19, and stores (temporarily stores) the operation data in the buffer area of the internal main memory 35 or the external main memory 12. Similarly to the external main memory 12, the internal main memory 35 may store various data and programs such as the game program read from the optical disc 4; a game program read from the flash memory 17; and the like, and may be used as a work area and a buffer area for the CPU 10.

The extension connector 20 and the external memory card connector 21 are connected to the input-output processor 31. The extension connector 20 is a connector for an interface such as USB and SCSI, and the communication with the network is enabled by connecting a medium such as an external storage medium, a peripheral device such as another controller, or a wired connector for communication to the extension connector 20 instead of the wireless communication module 18. The external memory card connector 21 is a connector for connecting thereto an external storage medium such as a memory card. For example, the input-output processor 31 accesses the external storage medium via the extension connector 20 and the external memory card connector 21 for storing data in the external storage medium and reading data from the external storage medium.

On the game apparatus body 5 (e.g. on a front main surface), a power button 24 of the game apparatus body 5, a reset button 25 for game processing, an insertion slot for mounting the optical disc 4 in a detachable manner, an eject button 26 for ejecting the optical disc 4 from the insertion slot of the game apparatus body 5, and the like are provided. The power button 24 and the reset button 25 are connected to the system LSI 11. When the power button 24 is turned on, electric power is supplied to each component of the game apparatus body 5 via an AC adaptor (not shown). When the reset button 25 is pressed, the system LSI 11 re-executes a boot program of the game apparatus body 5. The eject button 26 is connected to the disc drive 14. When the eject button 26 is pressed, the optical disc 4 is ejected from the disc drive 14.

Figure 3:
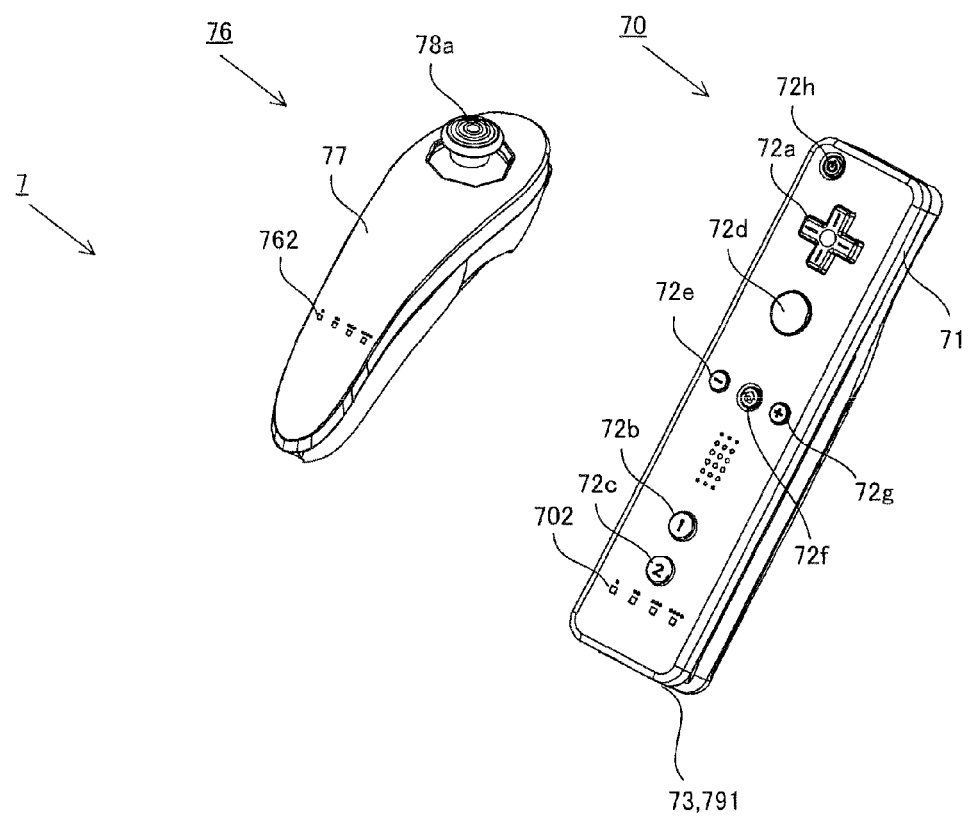
FIG. 3 is a perspective view showing an exemplary external configuration of a controller 7 in FIG. 1.

The following will describe the controller 7 with reference to FIG. 3. FIG. 3 is a perspective view showing an exemplary external configuration of the controller 7.

Referring to FIG. 3, the controller 7 includes the core unit 70 and the subunit 76. Specifically, the core unit 70 and the subunit 76 are not connected to each other via a connection cable or the like, and are separated from each other. The core unit 70 includes a housing 71, and is provided with a plurality of operation sections 72 on the housing 71. The core unit 70 is also provided with LEDs 702 that is an example of a display section for identifying a combination with the subunit 76. On the other hand, the subunit 76 includes a housing 77, and is provided with a plurality of operation sections 78 on the housing 77. The subunit 76 is also provided with LEDs 762 that is an example of a display section for identifying a combination with the core unit 70.

Figure 4:
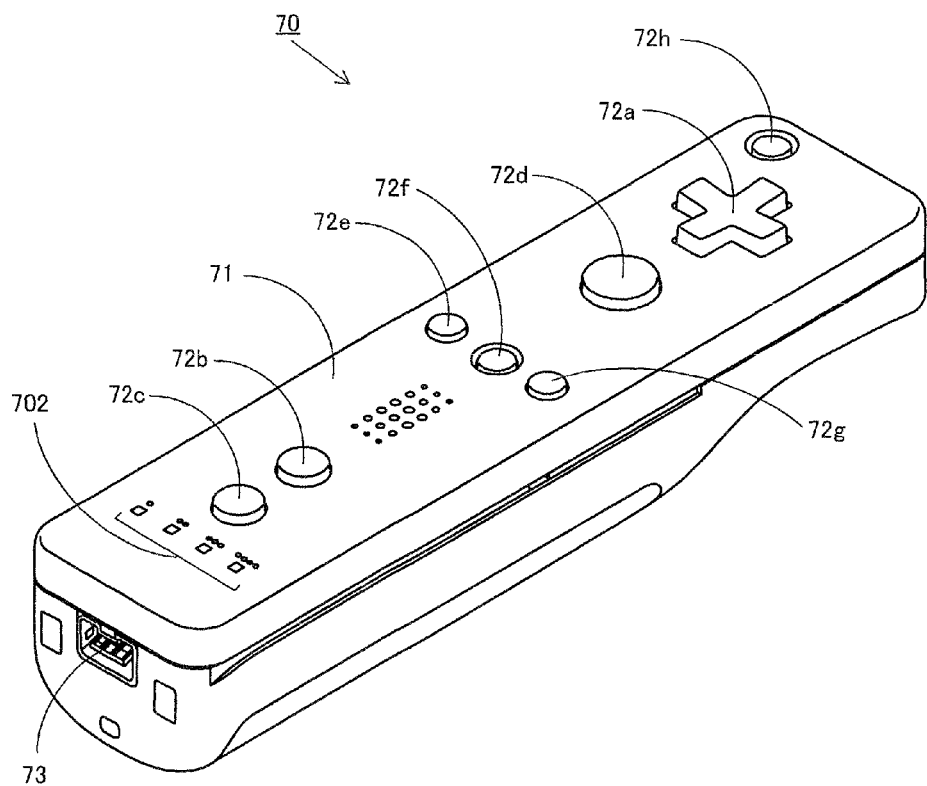
FIG. 4 is a perspective view of a core unit 70 in FIG. 3 seen from a top rear side thereof.
Figure 5:
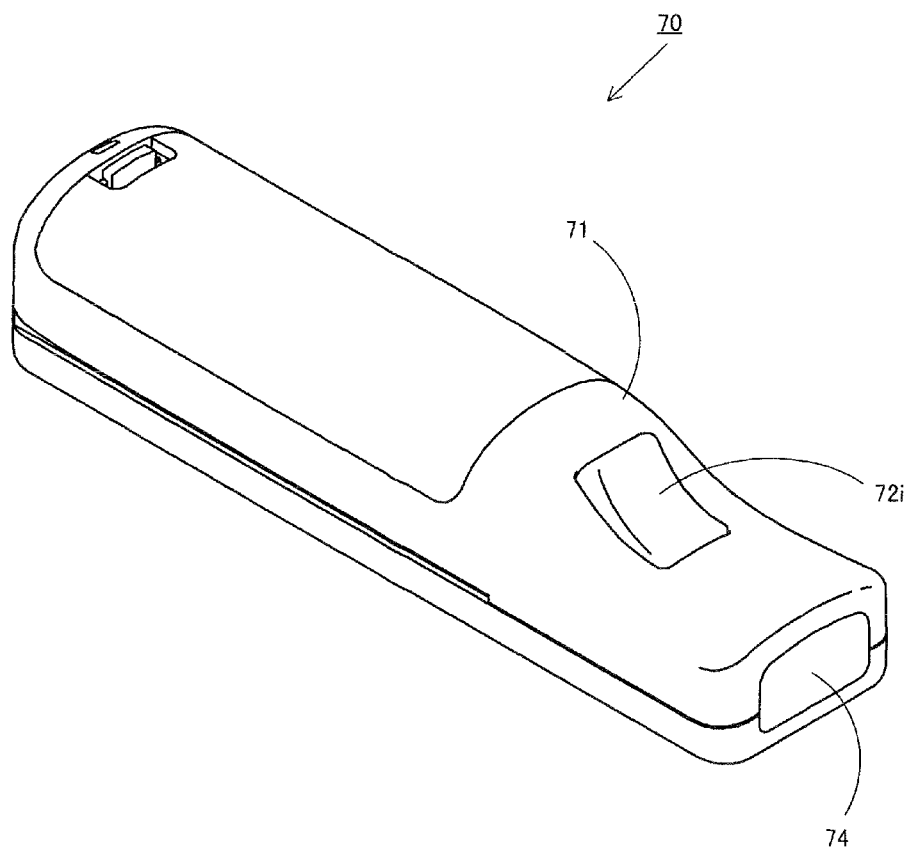
FIG. 5 is a perspective view of the core unit 70 in FIG. 3 seen from a bottom front side thereof.

The following will describe the core unit 70 with reference to FIGS. 4 and 5. FIG. 4 is a perspective view of the core unit 70 seen from a top rear side thereof. FIG. 5 is a perspective view of the core unit 70 seen from a bottom front side thereof.

Referring to FIGS. 4 and 5, the core unit 70 includes the housing 71 formed, for example, by plastic molding. The housing 71 has a generally parallelepiped shape extending in a longitudinal direction from front to rear, and the overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions, corresponding to four directions (front, rear, right, and left) indicated by arrows, which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, perform an instruction of a direction in which a player character or the like appearing in a virtual game world is to move, or perform an instruction of a direction in which a cursor is to move.

The cross key 72a is an operation section for outputting an operation signal in accordance with the above-described direction input operation performed by the player. Such an operation section may be provided in another form. For example, the cross key 72a may be replaced with a composite switch that includes: a push switch with operation portions of four directions which are arranged in a ring; and a center switch provided at the center of the push switch. Alternatively, the cross key 72a may be replaced with an operation section that includes an inclinable stick projecting from the top surface of the housing 71 and that outputs an operation signal in accordance with an inclining direction of the stick. Still alternatively, the cross key 72a may be replaced with an operation section that includes a disc-shaped and horizontally slidable member and that outputs an operation signal in accordance with a sliding direction of the disc-shaped member. Still alternatively, the cross key 72a may be replaced with a touch pad. Still alternatively, the cross key 72a may be replaced with an operation section that includes switches indicating at least four directions (front, rear, left, and right) and that outputs an operation signal in accordance with a switch pressed by the player.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a number one button, a number two button, and an A button are assigned to the operation buttons 72b to 72d, respectively. Also, functions as a minus button, a home button, and a plus button are assigned to the operation buttons 72e to 72g, respectively. The operation buttons 72b to 72g are assigned with functions in accordance with the game program executed by the game apparatus 3. In an exemplary arrangement shown in FIG. 4, the operation buttons 72b to 72d are arranged on the top surface of the housing 71 in a line at the center in a front-rear direction. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Although described in detail later, a pair number is assigned to the controller 7 for identifying a combination of the core unit 70 and the subunit 76. For example, the LEDs 702 are used for informing the player of the pair number that is currently set to the core unit 70. Specifically, pair display data for lighting up one of the plurality of LEDs 702 that corresponds to the pair number, is transmitted from the wireless controller module 19 to the core unit 70. Then, the core unit 70 lights up the one of the plurality of LEDs 702 that corresponds to the transmitted pair display data. In the example shown in FIG. 4, four LEDs 702 are arranged in a line in the left-right direction of the core unit 70, and at least four combinations can be indicated so as to be distinguished from each other by which of the four LEDs 702 is lit up. The plurality of LEDs 702 may not be arranged in the left-right direction. For example, the plurality of LEDs 702 may be arranged in a line in another direction (e.g. in the front-rear direction of the core unit 70), or may be arranged in a grid-like manner.

In the top surface of the housing 71, a plurality of holes is formed between the operation button 72b and the operation buttons 72e to 72g for outputting sound from a later-described speaker (a speaker 706 in FIG. 6) to the outside therethrough.

On a bottom surface of the housing 71, a recessed portion is formed. The recessed portion on the bottom surface of the housing 71 is formed in a position in which an index finger or middle finger of the player is located when the player holds the core unit 70. On a slope surface of the recessed portion, an operation button 72i is provided. The operation button 72i is an operation section acting as, for example, a B button.

In the front surface of the housing 71, an image pickup element 743 constituting a part of the imaging information calculation section 74 is provided. The imaging information calculation section 74 is a system for analyzing image data of an image taken by the core unit 70, thereby identifying an area having a high brightness in the image and detecting the position of the center of gravity, the size and the like of the area. The imaging information calculation section 74 has, for example, a maximum sampling period of about 200 frames/sec, and therefore can trace and analyze even a relatively fast motion of the core unit 70. A configuration of the imaging information calculation section 74 will be described later in detail. In a rear surface of the housing 71, a connector 73 is provided. The connector 73 is, for example, an edge connector, and is used for engaging and connecting the core unit 70 with a connection cable. In the present embodiment, the connector 73 is used for a pair change operation (pairing operation) for pairing the core unit 70 and the subunit 76. Specifically, when a pair change operation for pairing the core unit 70 and the subunit 76 that are to be used by a player is performed, the pair change operation is performed by temporarily connecting the connector 73 of the core unit 70 and a connector 763 (see FIGS. 8 and 9) of the subunit 76 that are to be used by the player.

Figure 6:
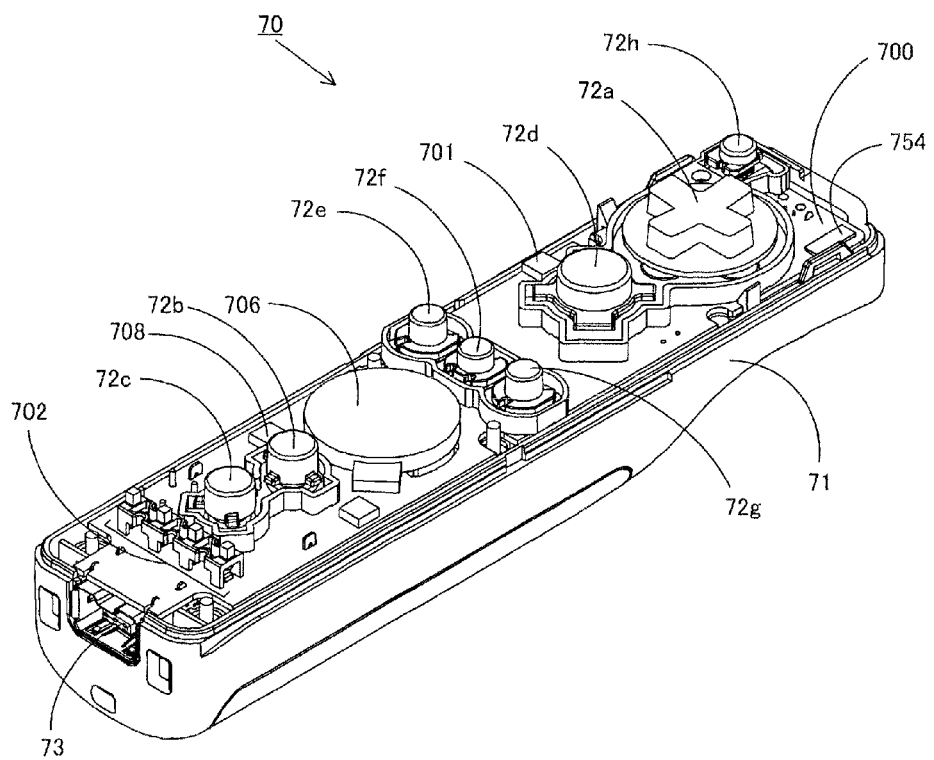
FIG. 6 is a perspective view showing an example of the core unit 70 in FIG. 3 in a state where an upper housing thereof is removed.
Figure 7:
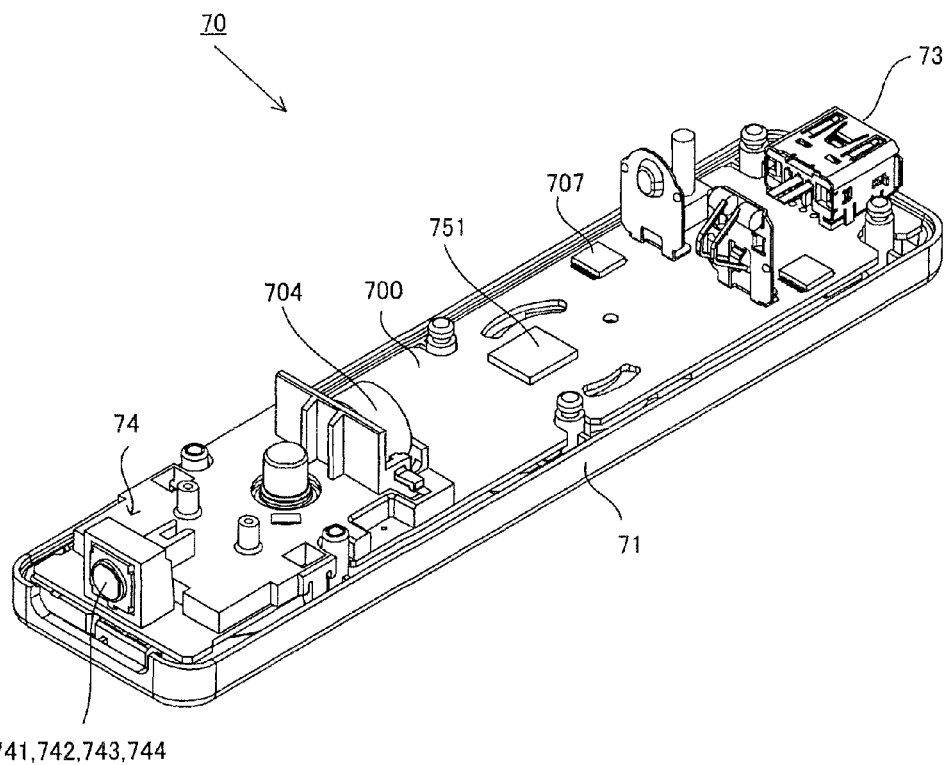
FIG. 7 is a perspective view showing an example of the core unit 70 in FIG. 3 in a state where a lower housing thereof is removed.

The following will describe an internal configuration of the core unit 70 with reference to FIGS. 6 and 7. FIG. 6 is a perspective view of the core unit 70 seen from a rear side thereof, in a state where an upper housing thereof (a part of the housing 71) is removed. FIG. 7 is a perspective view of the core unit 70 seen from a front side thereof, in a state where a lower housing thereof (a part of the housing 71) is removed. FIG. 7 shows a reverse side of a substrate 700 shown in FIG. 6.

Referring to FIG. 6, the substrate 700 is fixed inside the housing 71. On a top main surface of the substrate 700, the operation buttons 72a to 72h, an acceleration sensor 701, the LEDs 702, and an antenna 754 and the like are provided. These components are connected to a microcomputer 751 and the like (see FIGS. 7 and 10) by lines (not shown) formed on the substrate 700 and the like. The core unit 70 functions as a wireless controller by a wireless module 753 (see FIG. 10), which is not shown in FIG. 6, and the antenna 754. For example, the microcomputer 751 lights up one of the plurality of LEDs 702 that corresponds to pair display data received by the wireless module 753 and the antenna 754. In the housing 71, a crystal oscillator (not shown) is provided for generating a basic clock of the later-described microcomputer 751. On the top main surface of the substrate 700, the speaker 706 and an amplifier 708 are provided.

The acceleration sensor 701 is provided on the left side of the operation button 72d on the substrate 700 (i.e. on the periphery of the substrate 700, not on the center thereof). The acceleration sensor 701 is capable of detecting acceleration included in a component caused by a centrifugal force in accordance with rotation of the core unit 70 about the longitudinal direction thereof, in addition to change of the direction of gravitational acceleration. Thus, the game apparatus body 5 or the like can be sensitive enough to determine the motion of the core unit 70 from detected acceleration data using a predetermined calculation. For example, the core unit 70 includes a three-axis acceleration sensor 701. The three-axis acceleration sensor 701 detects linear acceleration in three directions, namely, in an up-down direction, a left-right direction, and a front-rear direction. Data indicative of acceleration detected by the acceleration sensor 701 is outputted to the microcomputer 751. In addition to the acceleration sensor, a gyro-sensor may be included.

Referring to FIG. 7, at a front edge of a bottom main surface of the substrate 700, the imaging information calculation section 74 is provided. The imaging information calculation section 74 includes an infrared filter 741, a lens 742, the image pickup element 743, and an image processing circuit 744 which are located in this order from the front surface of the core unit 70. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus body 5. On the bottom main surface of the substrate 700, a vibrator 704 is attached. The vibrator 704 is, for example, a vibration motor or a solenoid. The core unit 70 is vibrated by an actuation of the vibrator 704, and the vibration is conveyed to the player holding the core unit 70. Thus, a so-called vibration-feedback game is realized. Because the vibrator 704 is located in the front portion of the housing 71, the housing 71 is vibrated substantially, and hence the player holding the core unit 70 easily feels the vibration.

Figure 9:
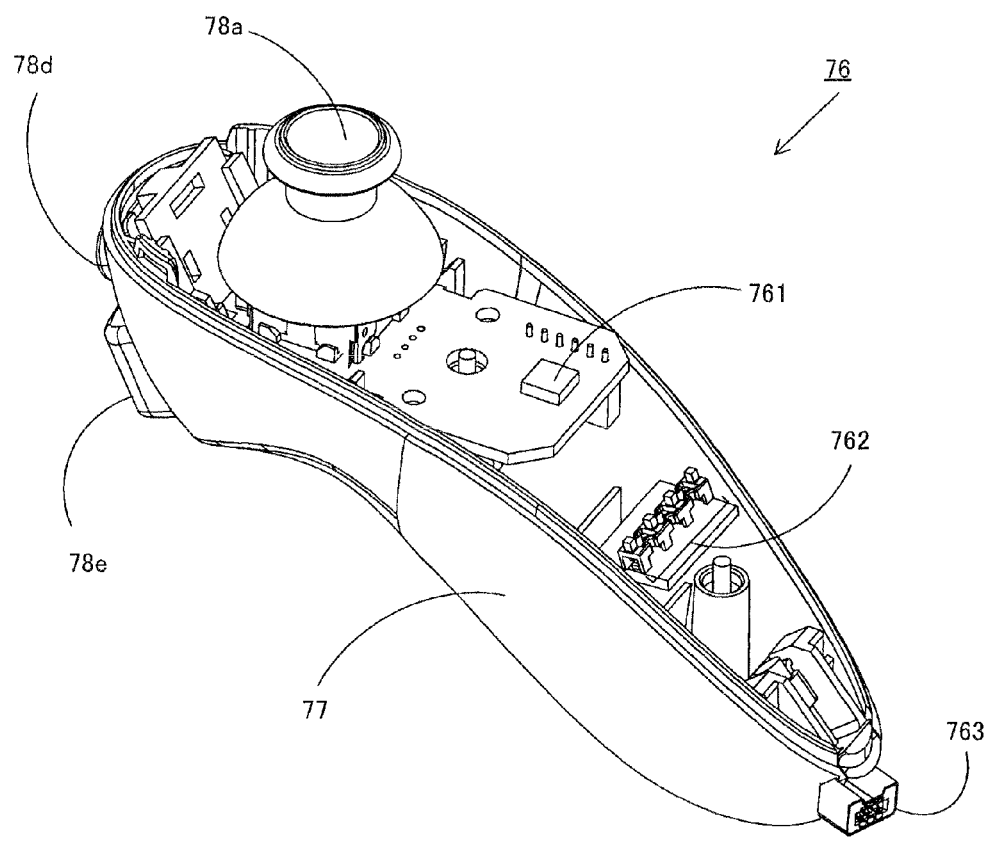
FIG. 9 is a perspective view showing an example of the subunit 76 in FIG. 3 in a state where an upper housing thereof is removed.

The subunit 76 will be described with reference to FIGS. 8 and 9. FIG. 8 is a perspective view showing an example of the subunit 76. FIG. 9 is a perspective view showing an example of the subunit 76 in FIG. 8, in a state where au upper housing (a part of the housing 77) thereof is removed Referring to FIG. 8, the subunit 76 includes the housing 77 formed, for example, by plastic molding. The housing 77 extends in a longitudinal direction from front to rear, and has a streamline solid shape including a head that is the widest portion in the subunit 76. The overall size of the subunit 76 is small enough to be held by one hand of an adult or even a child.

On a top surface of the housing 77 and in the vicinity of the widest portion, the stick 78a is provided. The stick 78a is an operation section that includes an inclinable stick projecting from the top surface of the housing 77, and outputs an operation signal in accordance with the inclining direction by inclining the stick. For example, the player can optionally designate a direction and a position by inclining the tip of the stick 78a in a direction of 0 to 360 degrees, thereby performing an instruction of a direction in which a player character or the like appearing in a virtual game world is to move. The player can perform an instruction of a moving amount for which the player character is to move.

The stick 78a is an operation section for outputting an operation signal in accordance with a direction input operation performed by the player. Such an operation section may be provided in another form. For example, the stick 78a may be replaced with the aforementioned cross key or the aforementioned composite switch that includes: a push switch with operation portions of four directions which are arranged in a ring; and a center switch provided at the center of the push switch. Alternatively, the stick 78a may be replaced with an operation section that includes a disc-shaped and horizontally slidable member and that outputs an operation signal in accordance with a sliding direction of the disc-shaped member. Still alternatively, the stick 78a may be replaced with a touch pad. Still alternatively, the stick 78a may be replaced with an operation section that includes switches indicating at least four directions (front, rear, left, and right) and that outputs an operation signal in accordance with a switch pressed by the player.

On a front surface of the housing 77 of the subunit 76, two operation buttons 78d and 78e are provided. The operation buttons 78d and 78e are each an operation section for, when the player presses a head thereof, outputting a corresponding operation signal. For example, functions as a C button and a Z button are assigned to the operation buttons 72d to 72e, respectively. The operation buttons 72d to 72e are assigned with functions in accordance with the game program executed by the game apparatus body 5. In an exemplary arrangement shown in FIG. 8, the operation buttons 72d to 72e are arranged on the front surface of the housing 77 in a line in an up-down direction.

Behind the stick 78a on the top surface of the housing 77, a plurality of the LEDs 762 are provided. A pair number is assigned to the controller 7 for identifying a combination of the core unit 70 and the subunit 76. The pair number is used as a player number in a game. The LEDs 762 are an example of a means used for informing the player of the pair number that is currently set to the subunit 76. Specifically, pair display data for lighting up one of the plurality of LEDs 762 that corresponds to the pair number is transmitted from the wireless controller module 19 to the subunit 76. Then, the subunit 76 lights up the one of the plurality of LEDs 762 that corresponds to the transmitted pair display data. In the example shown in FIG. 8, four LEDs 762 are arranged in a line in the left-right direction of the subunit 76, at least four combinations can be indicated so as to be distinguished from each other by which of the four LEDs 762 is lit up. The layout of the plurality of LEDs 762 is preferably the same as the layout of the plurality of LEDs 702 provided in the core unit 70 in order to be able to intuitively recognize a display for the combination of the core unit 70 and the subunit 76. Thus, similarly to the LEDs 702, the plurality of LEDs 762 may not be arranged in the left-right direction. For example, the plurality of LEDs 762 may be arranged in a line in another direction (e.g. in the front-rear direction of the subunit 76), or may be arranged in a grid-like manner.

When the effect that enables a display for the combination to be intuitively recognized is not desired, the layout of the plurality of LEDs 702 provided in the core unit 70 may be different from the layout of the plurality of LEDs 762 provided in the subunit 76. For example, when a pair number is fixedly described near each LED such that the pair number can be informed of during lighting of each LED, the combination can be informed of to the player even if the layout of the LEDs 702 is different from the layout of the LEDs 762.

In a rear surface of the housing 77 of the subunit 76, the connector 763 is provided. The connector 763 is connectable to the connector 73 of the core unit 70, and is, for example, an edge connector. As described above, in the present embodiment, the connector 763 is used for the pair change operation for pairing the core unit 70 and the subunit 76, and the pair change operation is performed by temporarily connecting the connector 73 of the core unit 70 and the connector 763 of the subunit 76 that are to be used by a player. It is noted that the connector shape is not limited to the shape of the present embodiment but may be any shape. Further, terminals that are capable of contacting each other may be used instead of the connectors. In the present embodiment, the connector 73 and the connector 763 are configured so as to be connected directly to each other, but may be configured so as to be temporarily connected to each other via a cable.

Referring to FIG. 9, a substrate is fixed inside the housing 77. On a top main surface of the substrate, the stick 78a, an acceleration sensor 761, and the like are provided. On another substrate inside the housing 77, the plurality of LEDs 762 are provided. These components are connected to a microcomputer 765 (see FIG. 11) and the like by lines (not shown) formed inside the housing 77. The subunit 76 also functions as a wireless controller by a wireless module 767 (see FIG. 11) and an antenna 768 (see FIG. 11) that are not shown in FIG. 9. For example, the microcomputer 765 lights up one of the plurality of LEDs 762 that corresponds to pair display data received by the wireless module 767 and the antenna 768. The acceleration sensor 761 is preferably located at the center of the housing 77 in the longitudinal direction thereof and at the center of the housing 77 in the lateral direction thereof. For example, the subunit 76 includes a three-axis acceleration sensor 761. The three-axis acceleration sensor 761 detects linear acceleration in three directions, namely, in an up-down direction, a left-right direction, and a front-rear direction. Data indicative of acceleration detected by the acceleration sensor 761 is outputted to the microcomputer 765.

Figure 10:
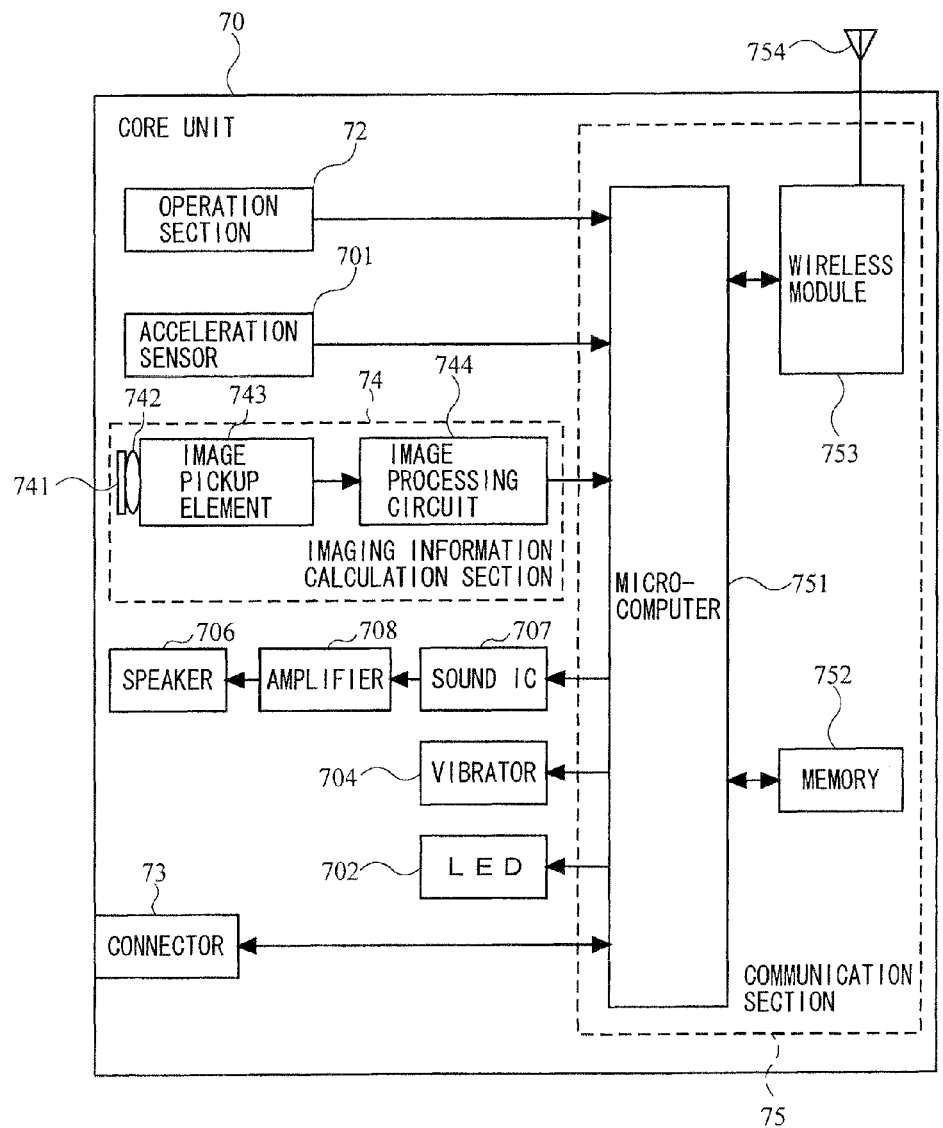
FIG. 10 is a block diagram showing an exemplary configuration of the core unit 70 in FIG. 3.
Figure 11:
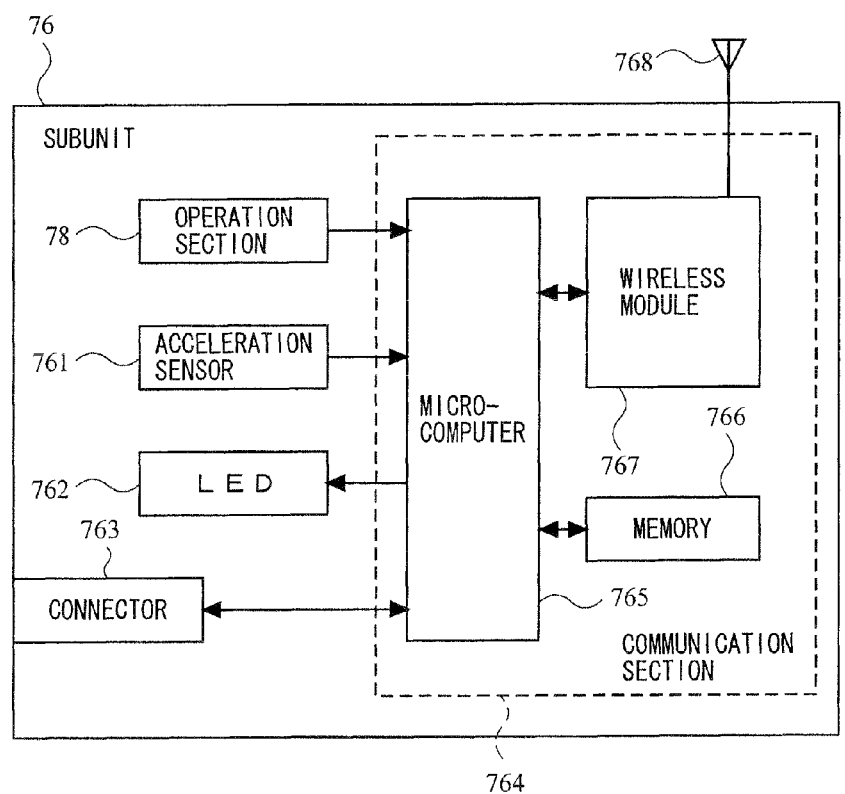
FIG. 11 is a block diagram showing an exemplary configuration of the subunit 76 in FIG. 3.

The following will describe an internal configuration of the controller 7 with reference to FIGS. 10 and 11. FIG. 10 is a block diagram showing an exemplary configuration of the core unit 70. FIG. 11 is a block diagram showing an exemplary configuration of the subunit 76.

Referring to FIG. 10, the core unit 7 includes therein the communication section 75 in addition to the operation section 72, the imaging information calculation section 74, the acceleration sensor 701, the LEDs 702, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the core unit 70, only an infrared light to pass therethrough. The lens 742 converges the infrared light that has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light that has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image that has a high brightness, and outputs, to the communication section 75, process result data indicative of, e.g., the calculated coordinate position and the square measure of the area. The imaging information calculation section 74 is fixed to the housing 71 of the core unit 70, and an imaging direction of the imaging information calculation section 74 can be changed by changing a facing direction of the housing 71.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the LEDs 702, the sound IC 707, and the vibrator 704 in accordance with the data that the wireless module 753 receives from the game apparatus body 5 via the antenna 754. The sound IC 707 processes the sound data and the like received from the game apparatus body 5 via the communication section 75. The microcomputer 751 controls lighting of the LEDs 702 in accordance with pair display data and the like received from the game apparatus body 5 via the communication section 75. The microcomputer 751 actuates the vibrator 704 in accordance with vibration data (e.g. signals for actuating and unactuating the vibrator 704) received from the game apparatus body 5 via the communication section 75.

An operation signal (core key data) from the operation section 72 provided in the core unit 70, an acceleration signal (core acceleration data) from the acceleration sensor 701, and processing result data from the imaging information calculation section 74 are outputted to the microcomputer 751. The microcomputer 751 temporarily stores, in the memory 752, each inputted data (the core key data, the core acceleration data, and the processing result data) as transmission data to be transmitted to the wireless controller module 19.

Referring to FIG. 11, the subunit 76 includes therein a communication section 764 in addition to the operation section 78, the acceleration sensor 761, the LEDs 762, and the connector 763.

The communication section 764 includes the microcomputer 765, a memory 766, the wireless module 767, and the antenna 768. The microcomputer 765 controls the wireless module 767 for wirelessly transmitting the transmission data while using the memory 766 as a storage area during processing. The microcomputer 765 controls lighting of the LEDs 762 in accordance with pair display data received from the game apparatus body 5 via the communication section 764.

An operation signal (sub key data) from the operation section 78 provided in the subunit 76 and an acceleration signal (sub acceleration data) from the acceleration sensor 761 are outputted to the microcomputer 765. The microcomputer 765 temporarily stores, in the memory 766, each inputted data (the sub key data and the sub acceleration data) as transmission data to be transmitted to the wireless controller module 19.

The wireless transmission from the communication section 75 and the communication section 764 to the wireless controller module 19 is performed periodically at a predetermined time interval. Because game processing is generally performed at a cycle of 1/60 sec., data needs to be collected and transmitted at a cycle shorter than 1/60. Specifically, the game processing unit is 16.7 ms (1/60 sec.), and the transmission interval of the communication section 75 and the communication section 764 configured using the Bluetooth (registered trademark) technology is 5 ms. At a timing of transmission to the wireless controller module 19, the microcomputer 751 outputs the transmission data stored in the memory 752 as a series of core operation information together with an ID number of the core unit 70, to the wireless module 753. For example, based on the Bluetooth (registered trademark) technology, the wireless module 753 modulates a carrier wave of a predetermined frequency with the core operation data, and radiates the resultant weak radio signal from the antenna 754. At a timing of transmission to the wireless controller module 19, the microcomputer 765 outputs the transmission data stored in the memory 766 as a series of sub operation information together with an ID number of the subunit 76, to the wireless module 767. For example, based on the Bluetooth (registered trademark) technology, the wireless module 767 modulates a carrier wave of a predetermined frequency with the sub operation data, and radiates the resultant weak radio signal from the antenna 768.

In other words, the core key data from the operation section 72 provided in the core unit 70, the core acceleration data from the acceleration sensor 701 provided in the core unit 70, and the processing result data from the imaging information calculation section 74 are modulated into a weak radio signal at the wireless module 753, and radiated from the core unit 70. The sub key data from the operation section 78 provided in the subunit 76 and the sub acceleration data from the acceleration sensor 761 provided in the subunit 76 are modulated into a weak radio signal at the wireless module 767, and radiated from the subunit 76. The wireless controller module 19 of the game apparatus 3 receives the weak radio signals, and the game apparatus 3 demodulates or decodes the weak radio signals to obtain the series of core operation information (the core key data, the core acceleration data, and the processing result data) and the series of sub operation information (the sub key data and the sub acceleration data) together with the ID numbers of the transmission sources. The CPU 10 of the game apparatus 3 performs game processing based on the obtained core operation information, the obtained sub operation information, and the game program.

When the connector 73 is connected to the connector 763 of the subunit 76, the communication section 75 outputs a device number (ID number) that is uniquely set in advance to the core unit 70, to the connected subunit 76 via the connector 73. When the connector 73 is connected to the connector 763 of the subunit 76, the communication section 75 obtains a device number (ID number) that is uniquely set to the subunit 76, from the connected subunit 76 via the connector 73. Then, although descried later, when the connector 73 is connected to the connector 763 of the subunit 76, the communication section 75 transmits, to the game apparatus body 5, contact data indicating that a pair change operation has been performed, together with the ID number of the core unit 70 and the obtained ID number of the subunit 76.

On the other hand, when the connector 763 is connected to the connector 73 of the core unit 70, the communication section 764 outputs the ID number of the subunit 76 to the connected core unit 70 via the connector 763. When the connector 763 is connected to the connector 73 of the core unit 70, the communication section 764 obtains the ID number that is set to the core unit 70, from the connected core unit 70 via the connector 763. Then, although described later, when the connector 763 is connected to the connector 73 of the core unit 70, the communication section 764 transmits, to the game apparatus body 5, contact data indicating that a pair change operation has been performed, together with the ID number of the sub unit 76 and the obtained ID number of the core unit 70.

Figure 12:
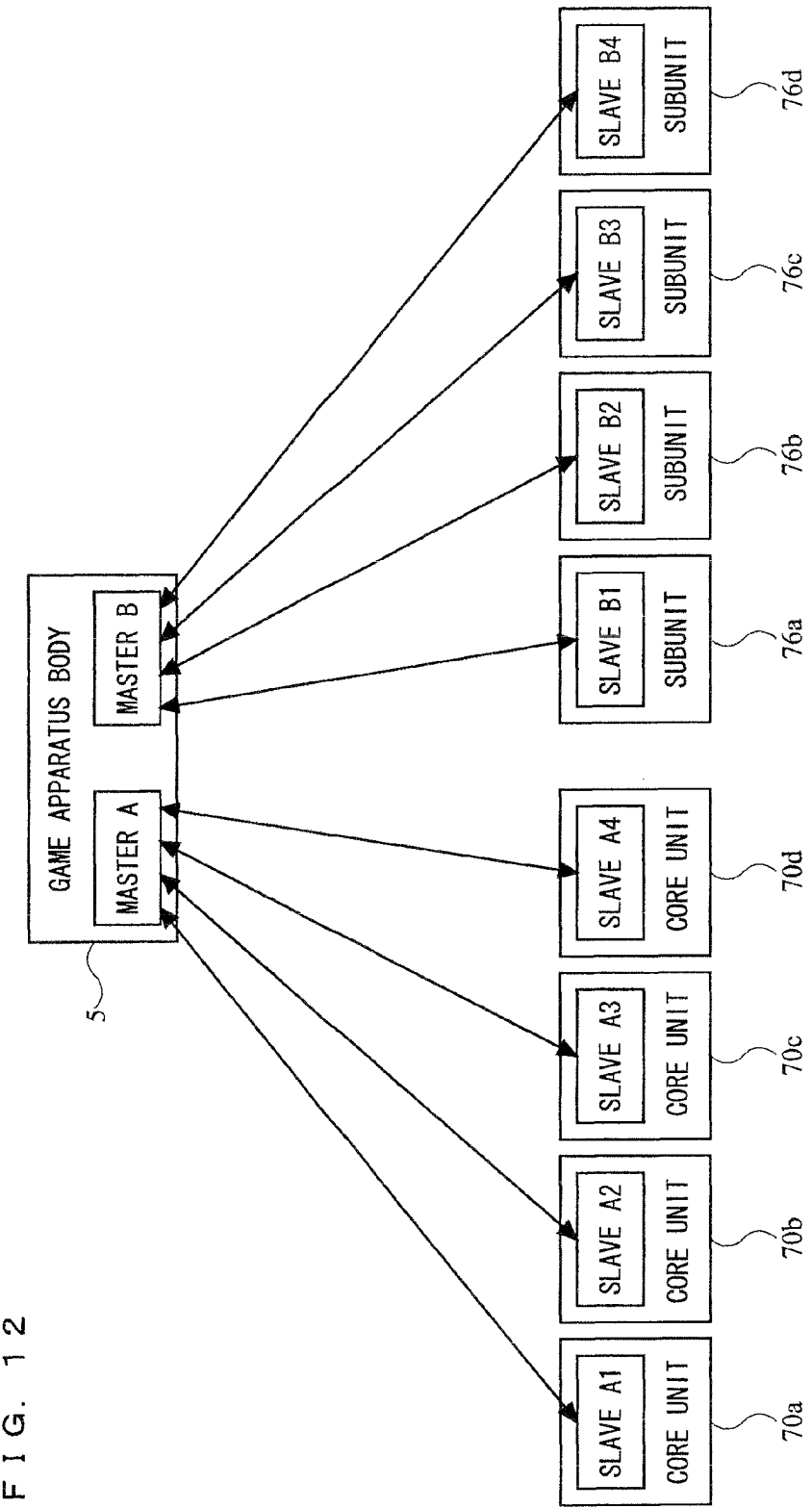
FIG. 12 is a block diagram showing an example of a communication system including a plurality of controllers 7 and a game apparatus body 5.

With reference to FIG. 12, the following will describe an example of a communication system including a plurality of controllers 7 and a game apparatus body 5. FIG. 12 shows an example of a communication system including: four controllers 7 each including a pair of a core unit 70 and a subunit 76; and a game apparatus body 5. For distinguishing the four pairs of the core units 70 and the subunits 76 from each other, the core units are designated by 70a, 70b, 70c and 70d, and the subunits are designated by 76a, 76b, 76c and 76d. In the following description, each component of the core units 70a, 70b, 70c, and 70d and each component of the subunits 76a, 76b, 76c, and 76d are designated by the corresponding reference numerals with a to d.

Figure 23:
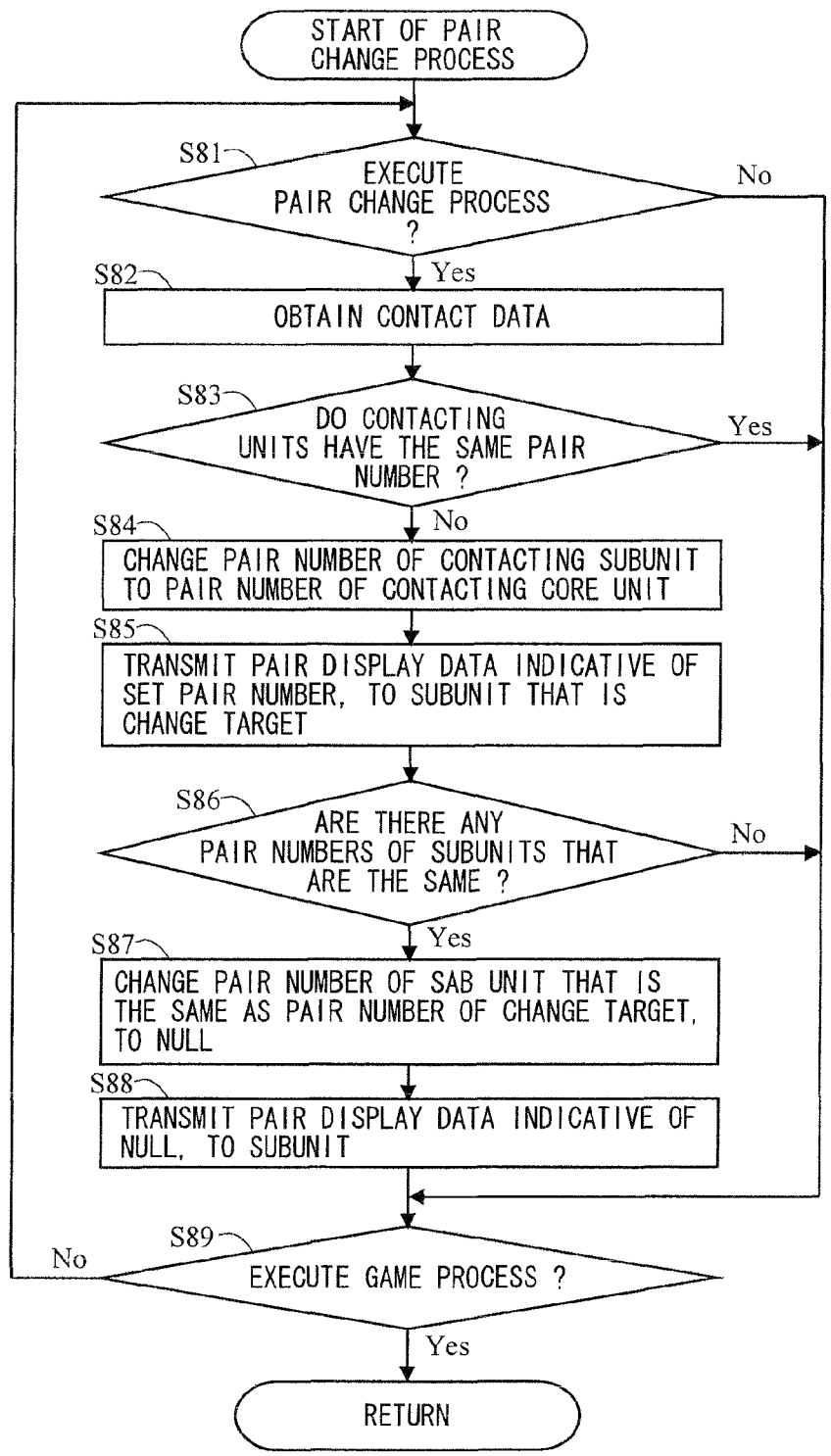
FIG. 23 is a subroutine showing an example of detailed operations of a pair change process at step 43 in FIG. 21.

In the example of the communication system shown in FIG. 12, the game apparatus body 5 becomes a master device in the communication system, and the controllers 7 become slave devices in the communication system. Specifically, the game apparatus body 5 constitutes two master devices (a master A and a master B). The core units 70a, 70b, 70c, and 70d become slave devices (slaves A1, A2, A3, and A3) corresponding to one (the master A) of the two master devices. The subunits 76a, 76b, 76c, and 76d become slave devices (slaves B1, B2, B3, and B4) corresponding to the other (master B) of the two master devices. In the present embodiment, the game apparatus body 5 includes the two master devices, and thus the antenna 23 in FIG. 23 is preferably composed of two antennas. The wireless controller module 19 may be composed of two units or a single unit.

The one master device (the master A) constituted by the game apparatus body 5 forms a Piconet with the corresponding slave devices (slaves A1 to A4), and performs communication with the corresponding slave devices (slaves A1 to A4). The other master device (master B) constituted by the game apparatus body 5 forms a Piconet with the corresponding slave devices (slaves B1 to B4), and performs communication with the corresponding slave devices (slaves B1 to B4). In other words, the core units 70a to 70d each perform communication with the game apparatus body 5, and the subunits 76a to 76d each perform communication with the game apparatus body 5.

Figure 13:
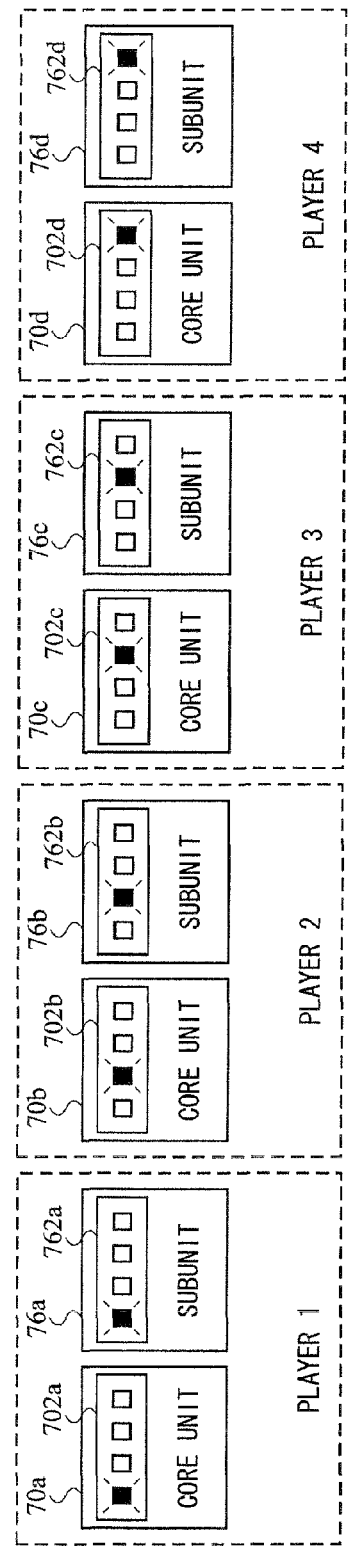
FIG. 13 illustrates a first display form example for distinguishing combinations of core units 70 and subunits 76 from each other.
Figure 14:
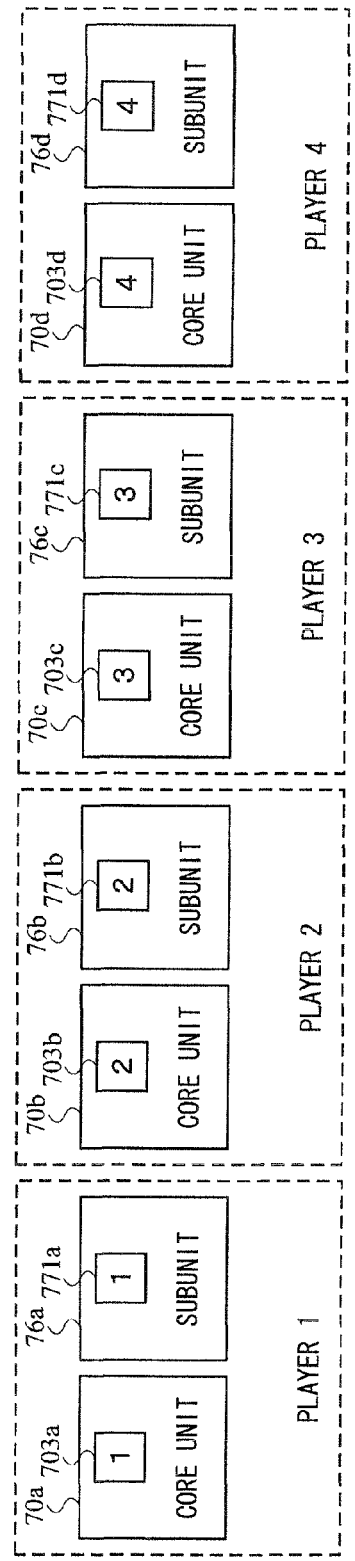
FIG. 14 illustrates a second display form example for distinguishing combinations of core units 70 and subunits 76 from each other.
Figure 15:
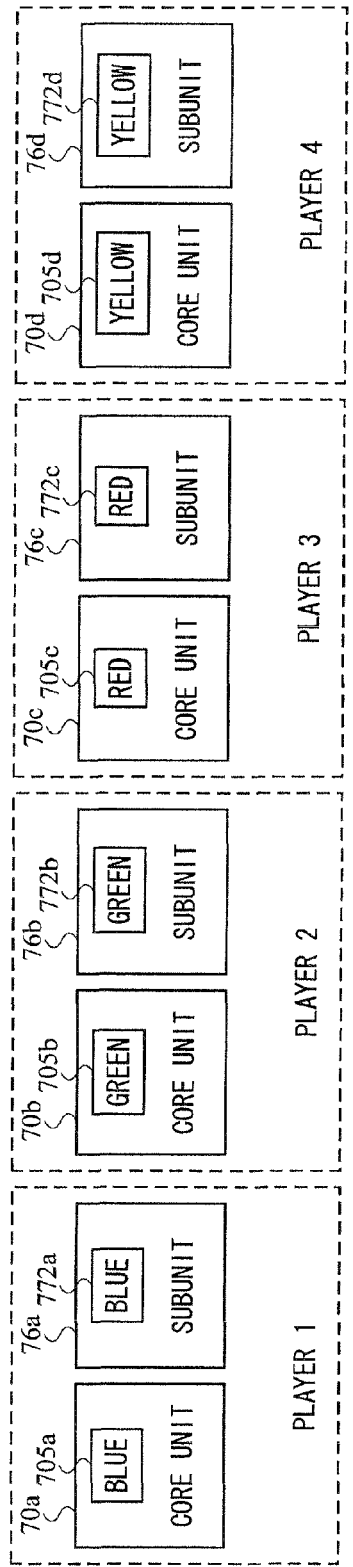
FIG. 15 illustrates a third display form example for distinguishing combinations of core units 70 and subunits 76 from each other.

With reference to FIGS. 13 to 15, the following will describe display forms for distinguishing combinations of core units 70 and subunits 76 from each other. FIG. 13 illustrates a first display form example for distinguishing combinations of core units 70 and subunits 76 from each other. FIG. 14 illustrates a second display form example for distinguishing combinations of core units 70 and subunits 76 from each other. FIG. 15 illustrates a third display form example for distinguishing combinations of core units 70 and subunits 76 from each other.

In the first display form example shown in FIG. 13, each core unit 70 lights up one of the plurality of LEDs 702 in accordance with pair display data transmitted from the one master device (master A) constituted by the game apparatus body 5, for identifying a combination with a subunit 76. On the other hand, each subunit 76 lights up one of the plurality of LEDs 762 in accordance with pair display data transmitted from the other master device (master B) constituted by the game apparatus body 5, for identifying a combination with a core unit 70. Specifically, a unit 70a lights up the leftmost LED out of a plurality of LEDs 702a. Then, a subunit 76a lights up the leftmost LED out of a plurality of LEDs 762a. In other words, the core unit 70a and the subunit 76a each light up the leftmost LED out of the plurality of LEDs, to indicate that the core unit 70a and the subunit 76a are paired (belong to the same pair) to be operated by the same player (e.g. a player 1). A core unit 70b and a subunit 76b each light up the second LED from left out of a plurality of LEDs, to indicate that the core unit 70b and the subunit 76b are paired to be operated by the same player (e.g. a player 2). A core unit 70c and a subunit 76c each light up the second LED from right out of a plurality of LEDs, to indicate that the core unit 70c and the subunit 76c are paired to be operated by the same player (e.g. a player 3). A core unit 70d and a subunit 76d each light up the rightmost LED out of a plurality of LEDs, to indicate that the core unit 70d and the subunit 76d are paired to be operated by the same player (e.g. a player 4).

In the first display form example shown in FIG. 13, when there is a unit that is not paired with another unit (does not belong to any pair), for example, when the number of core units 70 and the number of subunits 76 are different from each other, this unit lights up/puts out its LEDS in a form different from the above form for distinguishing combinations from each other. For example, a core unit 70 that is not paired with any subunit 76 puts out all of a plurality of LEDs 702, to indicate that there is no subunit 76 that is paired therewith. A subunit 76 that is not paired with any core unit 70 puts out all of a plurality of LEDs 762, to indicate that there is no core unit 70 that is paired therewith.

In the second display form example shown in FIG. 14, each core unit 70 is provided with a display device that is capable of displaying at least one of letter, symbol, pattern, image, and the like, as a display section for identifying a combination with a subunit 76. As an example, core units 70a to 70d shown in FIG. 14 are respectively provided with seven-segment displays 703a to 703d that are capable of displaying numerals, letters, symbols, and the like. Similarly, each subunit 76 is provided with a display device that is capable of displaying at least one of letter, symbol, pattern, image, and the like, as a display section for identifying a combination with a core unit 70. As an example, subunits 76a to 76d shown in FIG. 14 are respectively provided with seven-segment displays 771a to 771d that are capable of displaying numerals, letters, symbols, and the like. Alternatively, each unit may be provided with a screen such as a liquid crystal display, for performing a display to indicate a combination.

For example, each core unit 70 displays, on the seven-segment display 703, a pair number in accordance with pair display data transmitted from the one master device (master A) constituted by the game apparatus body 5, to identify a combination with a subunit 76. On the other hand, each subunit 76 displays, on the seven-segment display 771, a pair number in accordance with pair display data transmitted from the master device (master B) constituted by the game apparatus body 5, to identify a combination with a core unit 70. Specifically, the core unit 70a displays the numeral "1" on the seven-segment display 703a. The subunit 76a also displays the numeral "1" on the seven-segment display 771a. In other words, the core unit 70a and the subunit 76a display the numeral "1" on the seven-segment displays 703a and 771a, to indicate that the core unit 70a and the subunit 76a are paired (belong to the same pair) to be operated by the same player (e.g. a player 1). The core unit 70b and the subunit 76b display the numeral "2" on the seven-segment displays 703b and 771b, to indicate that the core unit 70b and the subunit 76b are paired (belong to the same pair) to be operated by the same player (e.g. a player 2).). The core unit 70c and the subunit 76c display the numeral "3" on the seven-segment displays 703c and 771c, to indicate that the core unit 70c and the subunit 76c are paired (belong to the same pair) to be operated by the same player (e.g. a player 3). The core unit 70d and the subunit 76d display the numeral "4" on the seven-segment displays 703d and 771d, to indicate that the core unit 70d and the subunit 76d are paired (belong to the same pair) to be operated by the same player (e.g. a player 4).

In the second display form example shown in FIG. 14, when there is a unit that is not paired with another unit (does not belong to any pair), for example, when the number of core units 70 and the number of subunits 76 are different from each other, this unit performs a display on the seven-segment display 703 or 711 in a form different from the above form for distinguishing combinations from each other, or causes the seven-segment display 703 or 711 to be in a non-display state. For example, a core unit 70 that is not paired with any subunit 76 causes the seven-segment display 703 to be in a non-display state, to indicate that there is no subunit 76 that is paired therewith. A subunit 76 that is not paired with any core unit 70 causes the seven-segment display 711 to be in a non-display state, to indicate that there is no core unit 70 that is paired therewith. Alternatively, for example, a unit flickers its seven-segment display 703 or its seven-segment display 711, to indicate that there is no unit that is paired therewith.

The display devices (e.g. the seven-segment displays 703 and 711) of the core unit 70 and the subunit 76 may not perform a display in the same form to indicate that the core unit 70 and the subunit 76 belong to the same pair. As a first example, one of the display devices of the core unit 70 and the subunit 76 displays a Chinese numeral, and the other displays an Arabic numeral. Then, when the Chinese numeral and the Arabic numeral indicate the same numeral, it indicates that the core unit 70 and the subunit 76 each of which indicates the numeral belong to the same pair. As a second example, the display devices of the core unit 70 and the subunit 76 respectively display images that are different from each other but clearly relate to each other, to indicate that the core unit 70 and the subunit 76 belong to the same pair. For example, different character images (e.g. images of brothers, mates, pair, and the like) that have a close relation in a game, or images of a character before and after evolution in a game are displayed on units to indicate that the units displaying the two character images belong to the same pair. As a third example, the display devices of the core unit 70 and the subunit 76 respectively displays images that are different from each other but are the same in kind or category, to indicate that the core unit 70 and the subunit 76 belong to the same pair. For example, categories include fish, animal, plant, vehicle, and the like, and a core unit 70 and a subunit 76 respectively display images that are different from each other but belong to the same category, to indicate that the core unit 70 and the subunit 76 belong to the same pair.

In the third display form example shown in FIG. 15, each core unit 70 is provided with a display device that is capable of displaying a plurality of colors, as a display section for identifying a combination with a subunit 76. As an example, core units 70a to 70d shown in FIG. 15 are provided with multicolor LEDs 705a to 705d, respectively. Similarly, a subunit 76 is provided with a display device that is capable of displaying a plurality of colors, as a display section for identifying a combination with a core unit 70. As an example, subunits 76a to 76d shown in FIG. 15 are provided with multicolor LEDs 772a to 772d, respectively.

For example, each core unit 70 displays, on the multicolor LED 705, a color in accordance with pair display data transmitted from the one master device (master A) constituted by the game apparatus body 5, to identify a combination with a subunit 76. On the other hand, each subunit 76 displays, on the multicolor LED 772, a color in accordance with pair display data transmitted from the other master device (master B) constituted by the game apparatus body 5, to identify a combination with a core unit 70. Specifically, the core unit 70a displays blue on the multicolor LED 705a. The subunit 76a also displays blue on the multicolor LED 772a. In other words, the core unit 70a and the subunit 76a display blue on the multicolor LEDs 705a and 772a, to indicate that the core unit 70a and the subunit 76a are paired (belong to the same pair) to be operated by the same player (e.g. a player 1). The core unit 70b and the subunit 76b display green on the multicolor LEDs 705b and 772b, to indicate that the core unit 70b and the subunit 76b are paired (belong to the same pair) to be operated by the same player (e.g. a player 2). The core unit 70c and the subunit 76c display red on the multicolor LEDs 705c and 772c, to indicate that the core unit 70c and the subunit 76c are paired (belong to the same pair) to be operated by the same player (e.g. a player 3). The core unit 70d and the subunit 76d display yellow on the multicolor LEDs 705d and 772d, to indicate that the core unit 70d and the subunit 76d are paired (belong to the same pair) to be operated by the same player (e.g. a player 4).

In the third display form example shown in FIG. 15, when there is a unit that is not paired with another unit (does not belong to any pair), for example, when the number of core units 70 and the number of subunits 76 are different from each other, this unit performs a display on the multicolor LED 705 or 772 in a form different from the above form for distinguishing combinations from each other, or causes the multicolor LED 705 or 772 to be in a non-display state. For example, a core unit 70 that is not paired with any subunit 76 causes the multicolor LED 705 to be in a non-display state, to indicate that there is no subunit 76 that is paired therewith. A subunit 76 that is not paired with any core unit 70 causes the multicolor LED 772 to be in a non-display state, to indicate that there is no core unit 70 that is paired therewith.

The display devices (e.g. the multicolor LEDs 705 and 772) of the core unit 70 and the subunit 76 may not display the same color to indicate that the core unit 70 and the subunit 76 belong to the same pair. Generally, a player can recognize that units belong to the same pair by colors that are not the same but are similar to each other, and there may be the case where expressed colors are slightly different from each other due to individual variation of display devices and the like. Thus, in the third display form example, a core unit 70 and a subunit 76 may display similar colors on their display devices, to indicate that the core unit 70 and the subunit 76 are paired to be operated by the same player.

Figure 16:
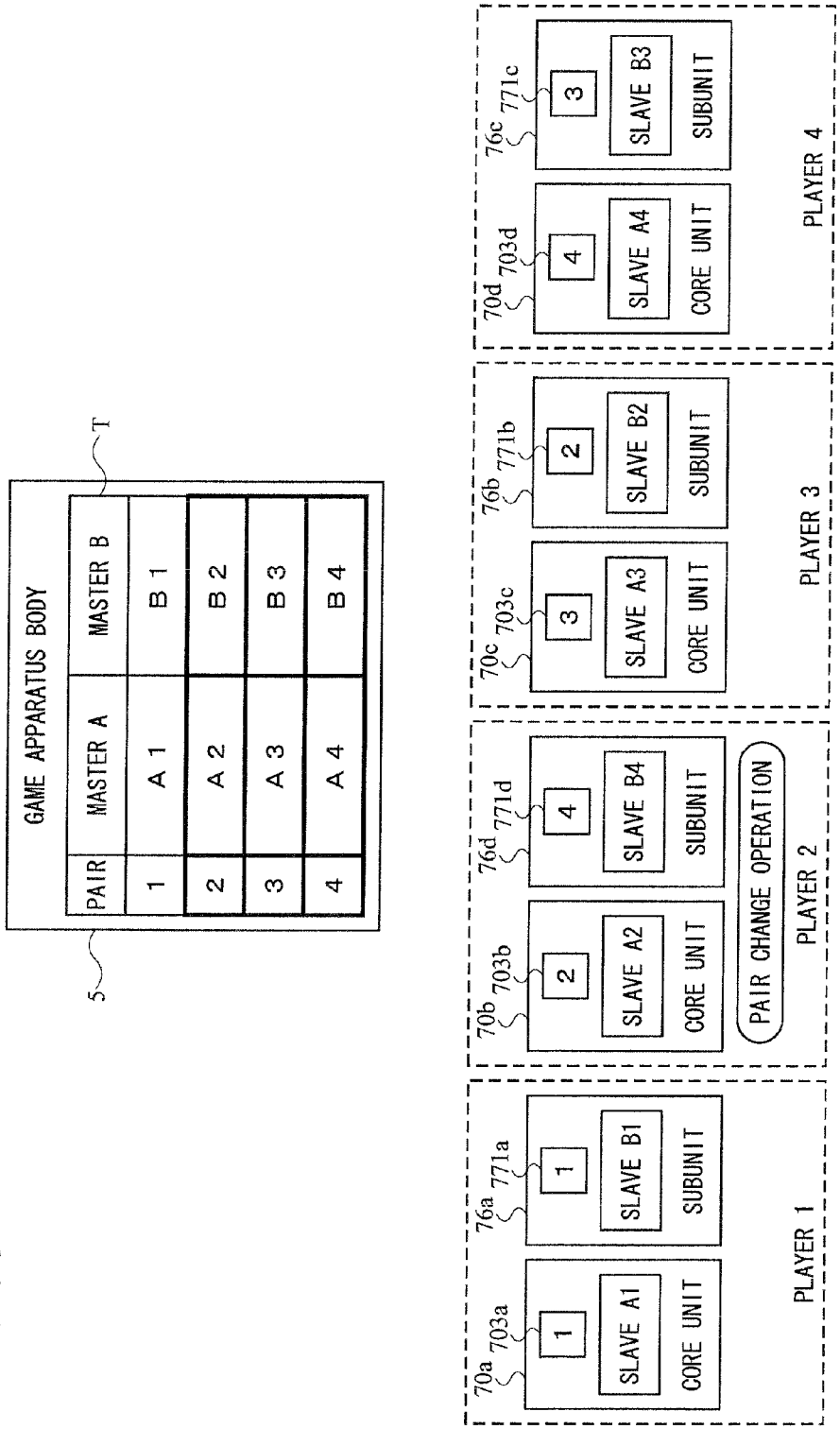
FIG. 16 illustrates a first stage of an example of a pair change process executed by the game apparatus body 5 in FIG. 1.
Figure 18:
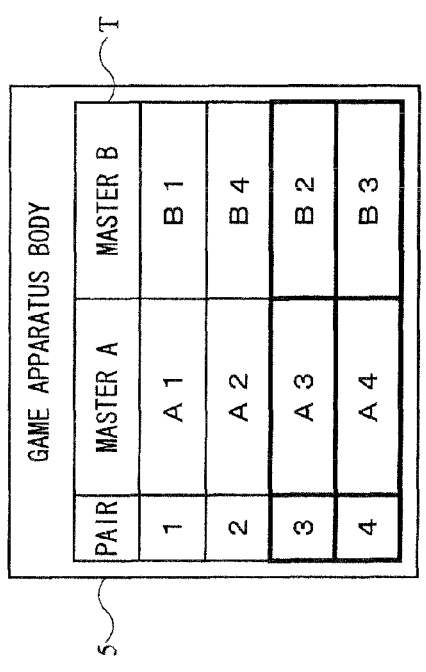
FIG. 18 illustrates a third stage of the example of the pair change process executed by the game apparatus body 5 in FIG. 1.
Figure 18:
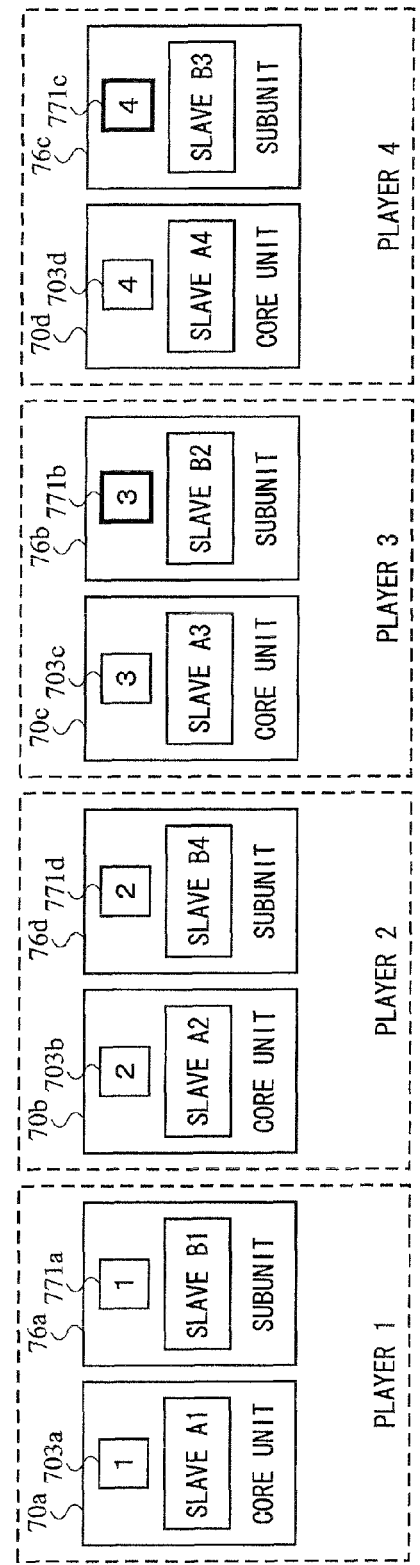

As described above, a combination of a core unit 70 and a subunit 76 to be operated by a player is clarified by visually confirming display sections, for identifying a combination, which are provided in the core unit 70 and the subunit 76, respectively. Then, on the assumption that the combination of the core unit 70 and the subunit 76 are operated by the same player, the game apparatus body 5 executes game processing. However, when a player operates a core unit 70 and a subunit 76 that belong to different pairs, the game apparatus body 5 can execute a pair change process. With reference to FIGS. 16 to 18, the following will describe an outline of the pair change process executed by the game apparatus body 5. FIG. 16 illustrates a first stage of an example of the pair change process executed by the game apparatus body 5. FIG. 17 illustrates a second stage of the example of the pair change process executed by the game apparatus body 5. FIG. 18 illustrates a third stage of the example of the pair change process executed by the game apparatus body 5. In FIGS. 16 to 18, the display section in the second display form example is used as a display section for identifying a combination of a core unit 70 and a subunit 76.

Referring to FIG. 16, combinations of core units 70 and subunits 76, which are currently set are administered in the game apparatus body 5. For example, the game apparatus body 5 administers a table data T in which slave devices (core units 70 and subunits 76) that belong to each pair numeral are described. In the state shown in FIG. 16, the slave A1 (core unit 70a) and a slave B1 (subunit 76a) belong to pair number 1; a slave A2 (core unit 70b) and a slave B2 (subunit 76b) belong to pair number 2; a slave A3 (core unit 70c) and a slave B3 (subunit 76c) belong to pair number 3; and a slave A4 (core unit 70d) and a slave B4 (subunit 76d) belong to pair number 4. On the other hand, a player 1 operates the core unit 70a and the subunit 76a; a player 2 operates the core unit 70b and the subunit 76d; a player 3 operates the core unit 70c and the subunit 76b; and a player 4 operates the core unit 70d and the subunit 76c. In other words, each of the players 2 to 4 operates the core unit 70 and the subunit 76 that belong to different pairs that are currently set.

In such a situation, the player 2 performs a pair change operation. Here, the pair change operation is an operation for informing the game apparatus body 5 of a pair of a core unit 70 and a subunit 76 that are being operated by a player. As an example, a player performs a pair change operation by connecting a connector 73 provided in a core unit 70 and a connector 763 provided in a subunit 76. When the pair change operation is performed, the core unit 70 and the subunit 76 transmit contact data to the game apparatus body 5. Here, the contact data is data containing: information (ID number) of a transmission source that transmits the contact data; and information (ID number) indicative of a partner device with respect to which the pair change operation is performed, namely, a partner device whose connector is connected to the connector of the transmission source. Specifically, as shown in FIG. 16, when a pair change operation is performed between the core unit 70b and the subunit 76d, the core unit 70b transmits, to the game apparatus body 5, contact data indicating that the pair change operation has been performed between the core unit 70b and the subunit 76d. The subunit 76d transmits, to the game apparatus body 5, contact data indicating that the pair change operation has been performed between the core unit 70b and the subunit 76d.

Upon receipt of the above contact data, the game apparatus body 5 can know that the pair change operation has been performed and between which units the pair change operation has been performed. Then, the game apparatus body 5 can infer that the combination of the core unit 70 and the subunit 76, with respect to which the pair change operation has been performed, is a combination currently operated by the same player. Thus, the game apparatus body 5 executes a pair change process such that the combination of the core unit 70 and the subunit 76, with respect to which the pair change operation has been performed, belong to the same pair number.

For example, when receiving the contact data indicating that the pair change operation has been performed between the core unit 70b and the subunit 76d, the game apparatus body 5 executes a pair change process such that the core unit 70b and the subunit 76d belong to the same pair (the state in FIG. 17). Specifically, the game apparatus body 5 changes the pair number to which the subunit 76d (slave B4) belongs from the pair number 4 to the pair number (i.e. the pair number 2) to which the core unit 70b (slave A2) belongs, and updates table data T. Whereby, the subunit corresponding to the pair number 4 to which the subunit 76d (slave B4) has belonged prior to the pair change process becomes blank. In addition, pair setting for the subunit 76b (slave B2) that has belonged to the pair number 2 prior to the pair change process for the subunit 76d (slave B4) is once cancelled (no pair number is assigned).

Then, the game apparatus body 5 transmits, to the targeted unit, pair display data indicative of the pair number changed by the pair change process. Specifically, the game apparatus body 5 transmits, to the subunit 76d (slave B4), pair display data indicating that the pair number has been changed to 2. In accordance with the pair display data being received, the subunit 76d displays the numeral "2" on the seven-segment display 771. In addition, the game apparatus body 5 transmits, to the subunit 76b (slave B2), pair display data indicating that the pair number has been changed to Null (pair setting has been cancelled). In accordance with the pair display data being received, the subunit 76b causes the seven-segment display 771 to be in a non-display state.

Next, the players 3 and 4 perform pair change operations. Specifically, pair change operations are performed between the core unit 70c and the subunit 76b shown in FIG. 17 and between the core unit 70d and the subunit 76c shown in FIG. 17. In this case, the core unit 70c transmits, to the game apparatus body 5, contact data indicating that the pair change operation has been performed between the core unit 70c and the subunit 76b. The subunit 76b transmits, to the game apparatus body 5, contact data indicating that the pair change operation has been performed between the core unit 70c and the subunit 76b. The core unit 70d transmits, to the game apparatus body 5, contact data indicating that the pair change operation has been performed between the core unit 70d and the subunit 76c. The subunit 76c transmits, to the game apparatus body 5, contact data indicating that the pair change operation has been performed between the core unit 70d and the subunit 76c.

When receiving the contact data indicating the pair change operation has been performed between the core unit 70c and the subunit 76b, the game apparatus body 5 executes a pair change process such that the core unit 70c and the subunit 76b belong to the same pair. In addition, when receiving the contact data indicating that the pair change operation has been performed between the core unit 70d and the subunit 76c, the game apparatus body 5 executes a pair change process such that the core unit 70d and the subunit 76c belong to the same pair (the state in FIG. 18). Specifically, the game apparatus body 5 changes the pair number to which the subunit 76b (slave B2) belongs from Null to the pair number (i.e. the pair number 3) to which the core unit 70c (slave A3) belongs to, and updates the table data T. The game apparatus body 5 changes the pair number to which the subunit 76c (slave B3) belongs from the pair number 3 to the pair number (i.e. the pair number 4) to which the core unit 70d (slave A4) belongs, and updates the table data T.

Then, the game apparatus body 5 transmits, to the targeted unit, pair display data indicative of the pair number changed by the pair change process. Specifically, the game apparatus body 5 transmits, to the subunit 76b (slave B2), pair display data indicating that the pair number has been changed to 3. In accordance with the pair display data being received, the subunit 76b displays the numeral "3" on the seven-segment display 771. In addition, the game apparatus body 5 transmits, to the subunit 76c (slave B3), pair display data indicating that the pair number has been changed to 4. In accordance with the pair display data being received, the subunit 76c displays the numeral "4" on the seven-segment display 771.

As described above, even when a core unit 70 and a subunit 76 belong to different pairs, a pair change process is executed such that the core unit 70 and the subunit 76 belong to the same pair, by a player, who uses the core unit 70 and the subunit 76, performing a pair change operation. Thus, even when a player holds a core unit 70 and a subunit 76 that belong to different pairs and plays a game, the pairs can be easily changed, and the player can play the game without changing the controllers.

Figure 19:
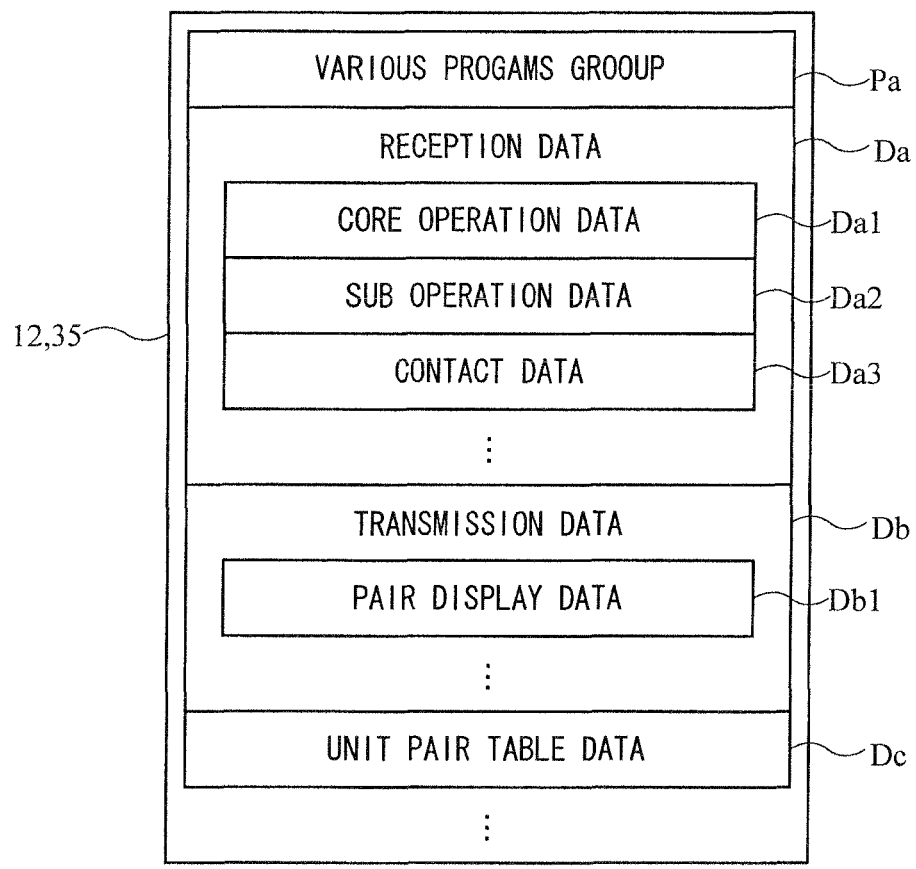
FIG. 19 shows an example of main data stored in a main memory of the game apparatus body 5 in FIG. 2.

With reference to FIG. 19, the following will describe main data used in game processing. FIG. 19 shows main data stored in the external main memory 12 and/or the internal main memory 35 (hereinafter, the two main memories are collectively referred to a main memory) of the game apparatus body 5.

Referring to FIG. 19, reception data Da, transmission data Db, unit pair table data Dc, and the like are stored in the data storage area of the main memory. In addition to the data shown in FIG. 19, data required for the game processing, such as data regarding objects and the like appearing in a game and data regarding a virtual game world, is stored in the main memory. Further, a various programs group Pa constituting the game program is stored in a program storage area of the main memory.

The reception data Da contains core operation data Da1, sub operation data Da2, contact data Da3, and the like. The core operation data Da1 is data indicative of contents of an operation with respect to each core unit 70, and a series of core operation information transmitted as transmission data is stored therein. The sub operation data Da2 is data indicative of contents of an operation with respect to each subunit 76, and a series of sub operation information transmitted as transmission data from each subunit 76 is stored therein. The contact data Da3 is data indicative of a core unit 70 and a subunit 76 with respect to which a pair change operation has been performed by a player, and contact data transmitted from the core unit 70 and the subunit 76, with respect to which the pair change operation has been performed, is stored therein.

The wireless controller module 19 provided in the game apparatus body 5 receives transmission data transmitted from the core unit 70 and the subunit 76 at a predetermined time interval (e.g. every 1/200 sec.), and stores the received transmission data in a buffer (not shown) provided in the wireless controller module 19. Then, for example, every one-frame period (every 1/60 sec.) that is a game processing cycle of the game apparatus body 5, transmission data stored during the frame is read and the reception data Da in the main memory is updated therewith.

The transmission data Db includes pair display data Db1. In the pair display data Db1 stored is data that is indicative of a combination (pair number) of a core unit 70 and a subunit 76 and is for causing the core unit 70 and/or the subunit 76 to display the pair.

At a timing of transmission (e.g. every 1/200 sec.), the wireless controller module 19 provided in the game apparatus body 5 transmits transmission data stored in the transmission data Db, to a core unit 70 or a subunit 76 that is a destination described in the transmission data.

Figure 20:
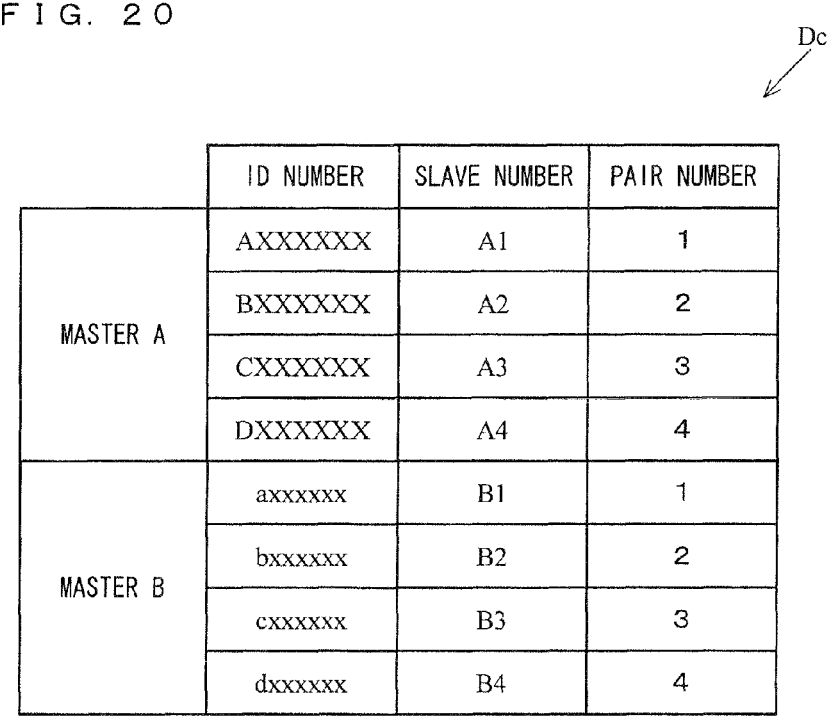
FIG. 20 shows an example of a unit pair table stored in unit pair table data Dc in FIG. 19.

In the unit pair table data Dc stored is data indicative of a unit pair table for administrating combinations of core units 70 and subunits 76 which are currently set. For example, as shown in FIG. 20, an ID number, a slave number, a pair number, and the like of each of core units 70 and subunits 76 with which the game apparatus body 5 is communicable are described in a unit pair table. Here, the ID number is a unique device number that is uniquely set in advance to each of the core units 70 and the subunits 76.

For example, in the unit pair table data Dc described are: the ID number, the slave number, the pair number, and the like of each of the core units 70 (slaves A), with which the one master device (master A) of the game apparatus body 5 communicates. Specifically, the slave number "A1" and the pair number "1" are described for the core unit 70 with the ID number "AXXXXXX". Further, in the unit pair table data Dc described are: the ID number, the slave number, the pair number, and the like of each of the subunits 760 (slaves B), with which the other master device (master B) of the game apparatus body 5 communicates. Specifically, the slave number "B1" and the pair number "1" are described for the subunit 76 with the ID number "BXXXXXX".

Figure 21:
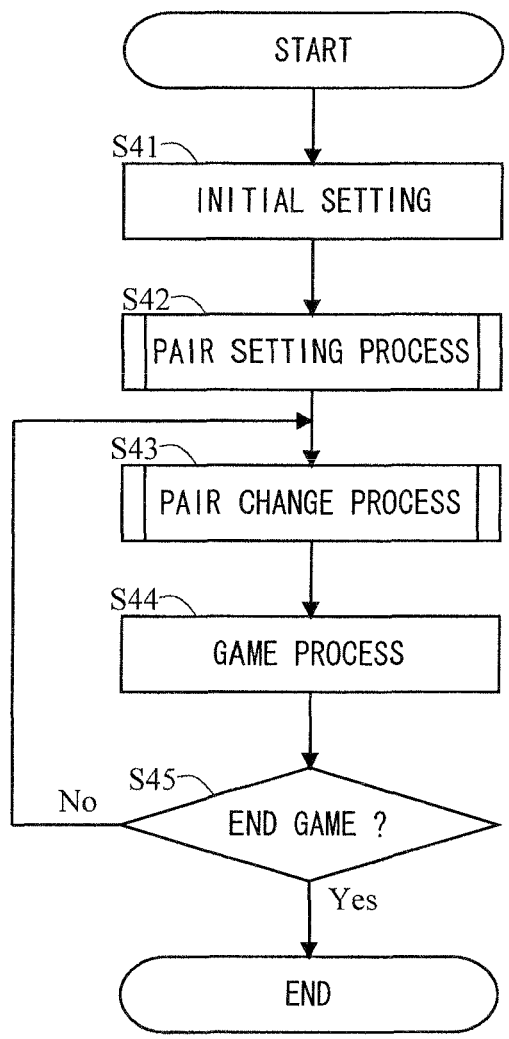
FIG. 21 is a flow chart showing an example of a procedure of processing executed by the game apparatus body 5 in FIG. 1.
Figure 22:
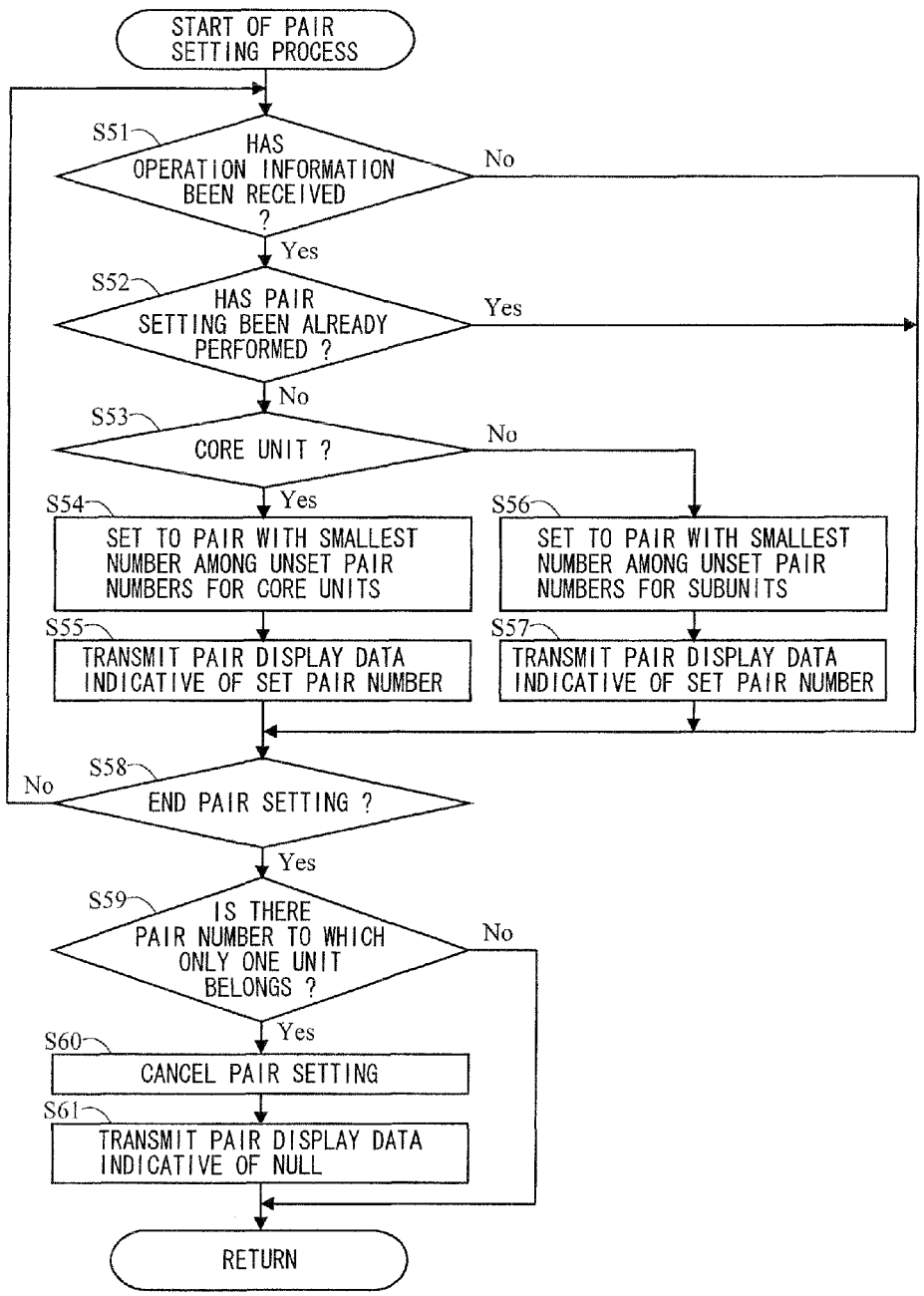
FIG. 22 is a subroutine showing an example of detailed operations of a pair setting process at step 42 in FIG. 21.

With reference to FIGS. 21 to 23, the following will describe in detail processing executed by the game apparatus body 5. FIG. 21 is a flow chart showing an example of a procedure of the processing executed by the game apparatus body 5. FIG. 22 is a subroutine showing an example of detailed operations of a pair setting process at step 42 in FIG. 21. FIG. 23 is a subroutine showing an example of detailed operations of a pair change process at step 43 in FIG. 21. It is noted that among the processing executed by the game apparatus body 5, a process of setting a pair of a core unit 70 and a subunit 76 will be described with reference to the flow charts shown in FIGS. 21 to 23, and other processes that are not directly relevant to the present invention will not be described in detail. In FIGS. 21 to 23, each step executed by the CPU 10 is abbreviated to "S".

When power is applied to the game apparatus body 5, the CPU 10 of the game apparatus body 5 executes the boot program stored in a boot ROM (e.g. the ROM/RTC 13) to initialize each unit such as the main memory and the like. Then, the game program stored in the optical disc 4 is read by the main memory, and the CPU 10 starts to execute the game program. The flow charts shown in FIGS. 21 to 23 show the processing that is executed after the completion of the above processing.

Referring to FIG. 21, the CPU 10 executes initial setting (step 41), and proceeds the processing to the next step. For example, in the initial setting at the step 41, the CPU 10 initializes each parameter stored in the main memory (e.g. initializes each parameter to be Null).

Next, the CPU 10 executes a pair setting process (step 42), and proceeds the processing to the next step. It is noted that because it is possible to play a game by using only a core unit 70, steps 42 and 43 may not executed in such a game. However, the following will describe an example of a game in which core units 70 and subunits 76 are used and it is possible to change combinations. With reference to FIG. 22, the following will describe the pair setting process executed at step 42.

Referring to FIG. 22, the CPU 10 determines whether or not operation information has been received from any one of the core units 70 and the subunits 76 (step 51). Then, when having received operation information from any one of the core units 70 and the subunits 76, the CPU 10 updates the core operation data Da1 or the sub operation data Da2 with the operation information based on the transmitted ID number, and proceeds the processing to the next step 52. On the other hand, when not having received operation information from any one of the core units 70 and the subunits 76, the CPU 10 proceeds the processing to the next step 58.

At step 52, the CPU 10 determines whether or not the core unit 70 or the subunit 76, which has transmitted the operation information, has been already set to belong to any pair. For example, the CPU 10 refers to the unit pair table data Dc, and determines whether or not the transmitted ID number, which corresponds to the core unit 70 or the subunit 76, has been already described. When the transmitted ID number has been already described, the core unit 70 or the subunit 76 of the ID number is determined to have been already set to belong to any pair. Then, when the core unit 70 or the subunit 76, which has transmitted the operation information, has not been set to belong to any pair yet, the CPU 10 proceeds the processing to the step 53. On the other hand, when the core unit 70 or the subunit 76, which has transmitted the operation information, has been set to belong to any pair, the CPU 10 proceeds the processing to the step 58.

At step 53, the CPU 10 determines whether or not the unit that has transmitted the operation information is a core unit 70. Then, when the unit that has transmitted the operation information is a core unit 70, the CPU 10 proceeds the processing to the next step 54. On the other hand, when the unit that has transmitted the operation information is a subunit 76, the CPU 10 proceeds the processing to the next step 56.

At step 54, the CPU 10 sets the core unit 70, which has transmitted the operation information, to belong to a pair with the smallest number among pair numbers that are not set to core units 70, and proceeds the processing to the next step. For example, the CPU 10 refers to the unit pair table data Dc, and assigns the core unit 70, which has transmitted the operation information, to the smallest unset pair number among pair numbers (e.g. pair numbers corresponding to the master A) at which ID numbers of core units 70 are described. Then, the CPU 10 describes the ID number of the core unit 70, which has transmitted the operation information, at the smallest pair number, and assigns an appropriate slave number thereto. Specifically, in the unit pair table data Dc shown in FIG. 20, the pair number "1" for a core unit 70 is assigned to the core unit 70 with the ID number "AXXXXXX", and the slave number "A1" is also assigned to the core unit 70.

Next, the CPU 10 transmits pair display data indicative of the pair number that is set at step 54, to the core unit 70 that has transmitted the operation information (step 55), and proceeds the processing to the next step 58. Upon receipt of the pair display data that is transmitted by the process at step 55, the core unit 70 that has transmitted the operation information knows the pair number thereof and lights up one of the LEDs 702 in accordance with the pair number.

On the other hand, at step 56, the CPU 10 sets the subunit 76, which has transmitted the operation information, to belong to a pair with the smallest number among pair numbers that are not set to subunits 76, and proceeds the processing to the next step. For example, the CPU 10 refers to the unit pair table data Dc, and assigns the subunit 76, which has transmitted the operation information, to the smallest pair number among pair numbers (e.g. pair numbers corresponding to the master B) at which ID numbers of subunits 76 are described. Then, the CPU 10 describes the ID number of the subunit 76, which has transmitted the operation information, at the smallest pair number, and assigns an appropriate slave number thereto. Specifically, in the unit pair table data Dc shown in FIG. 20, the pair number "1" for a subunit 76 is assigned to the subunit 76 with the ID number "axxxxxx", and the slave number "B1" is also assigned to the subunit 76.

Next, the CPU 10 transmits pair display data indicative of the pair number that is set at step 56, to the subunit 76 that has transmitted the operation information (step 57), and proceeds the processing to the next step 58. Upon receipt of the pair display data that is transmitted by the process at step 57, the subunit 76 that has transmitted the operation information knows the pair number thereof and lights up one of the LEDs 762 in accordance with the pair number.

At step 58, the CPU 10 determines whether or not to end the pair setting process for the core unit 70 and the subunit 76. The pair setting process is to be ended, for example, when the player has performed an operation for ending the pair setting process, or when predetermined conditions to end the pair setting process are satisfied (e.g. a predetermined time period has elapsed after the pair setting process is started). When continuing the pair setting process, the CPU 10 returns to step 51 to repeat the processing. On the other hand, when ending the pair setting process, the CPU 10 proceeds the processing to the next step 59.

At step 59, the CPU 10 determines whether or not there is any pair to which only one of a core unit 70 and a subunit 76 belongs, among pairs of core units and subunits 76 which are set through the processes at steps 51 to 58. For example, the CPU 10 refers to the unit pair table data Dc, and determines whether or not there is any pair number to which one of a core unit 70 and a subunit 76 belongs. Then, when there is a pair (pair number) to which only one of a core unit 70 and a subunit 76 belongs, the CPU 10 proceeds the processing to the next step 60. On the other hand, when there is no pair (pair number) to which only one of a core unit 70 and a subunit 76 belongs, the CPU 10 ends the processing of this subroutine.

At step 60, the CPU 10 cancels setting of the pair to which only one of a core unit 70 and a subunit 76 belongs, and proceeds the processing to the next step. For example, the CPU 10 refers to the unit pair table data Dc, and deletes each parameter (e.g. ID number) that is described at the pair number to which only one of a core unit 70 and a subunit 76 belongs.

Next, the CPU 10 transmits pair display data indicating that the pair number is Null, to the unit (the core unit 70 or the subunit 76) for which pair setting is cancelled at step 60 (step 61), and ends the processing of this subroutine. Upon receipt of the pair display data that is transmitted by the process at step 61, the unit (the core unit 70 or the subunit 76) that has received the pair display data knows that the unit does not belong to any pair, and indicates that the unit does not belong to any pair by using the LEDs 702 or the LEDs 762 (e.g. puts out all the LEDs 702 or all the LEDs 762).

Referring back to FIG. 21, after the pair setting process at step 42, the CPU 10 executes the pair change process (step 43), and proceeds the processing to the next step. With reference to FIG. 22, the following will describe the pair change process executed at step 43.

Referring to FIG. 23, the CPU 10 determines whether or not to execute the pair change process (step 81). For example, when the player performs the aforementioned pair change operation by using a core unit 70 and a subunit 76 and the CPU 10 receives contact data from the core unit 70 or the subunit 76, the CPU 10 determines to execute the pair change process. It is noted that various methods are considered as a method for the CPU 10 to determine whether or not to execute the pair change process, but other methods will be described later. Then, when executing the pair change process, the CPU 10 proceeds the processing to the next step 82. On the other hand, when not executing the pair change process, the CPU 10 proceeds the processing to the next step 89.

At step 82, the CPU 10 obtains contact data from the core unit 70 or the subunit 76 with respect to which the pair change operation has been performed, and proceeds the processing to the next step. For example, the CPU 10 updates the contact data Da3 with the contact data based on the ID number of the transmission source of the received contact data.

Next, the CPU 10 refers to the contact data that is obtained at step 82, and determines whether or not the core unit 70 and the subunit 76, with respect to which the pair change operation has been performed, belong to the same pair number (step 83). For example, the CPU 10 refers to the unit pair table data Dc, and determines whether or not the pair number corresponding to the ID number of the transmission source of the contact data that is received at step 82 is the same as the pair number corresponding to the ID number of the connection partner that is indicated by the contact data. Then, when the core unit 70 and the subunit 76, with respect to which the pair change operation has been performed, belong to different pair numbers, or when at least one of the core unit 70 and the subunit 76, with respect to which the pair change operation has been performed, does not belong to any pair, the CPU 10 proceeds the processing to the next step 84. On the other hand, when the core unit 70 and the subunit 76, with respect to which the pair change operation has been performed, belong to the same pair number, the CPU 10 proceeds the processing to the next step 89.

At step 84, the CPU 10 changes the pair number of the subunit 76, with respect to which the pair change operation has been performed, to the pair number of the core unit 70 with respect to which the pair change operation has been performed, and proceeds the processing to the next step. For example, the CPU 10 refers to the unit pair table data Dc, and extracts the pair number corresponding to the ID number of the core unit 70, among the ID numbers indicated by the contact data that is obtained at step 82. Then, the CPU 10 refers to the unit pair table data Dc, and changes, to the extracted pair number, the pair number corresponding to the ID number of the subunit 76, among the ID numbers indicated by the contact data that is obtained at step 82. Through the process at step 84, the core unit 70 and the subunit 76, with respect to which the pair change process has been performed, are changed to have the same pair number in the unit pair table data Dc.

Next, the CPU 10 transmits pair display data indicative of the pair number that is changed at step 84, to the subunit 76 with respect to which the pair change operation has been performed (step 85), and proceeds the processing to the next step. Upon receipt of the pair display data that is transmitted by the process at step 85, the subunit 76 that has received the pair display data knows that the pair number thereof has been changed, and lights up one of the LEDS 702 in accordance with the changed pair number.

Next, the CPU 10 determines whether or not there are subunits 76 whose pair numbers become the same due to the process at step 84 (step 86). For example, the CPU 10 refers to the unit pair table data Dc, and determines whether or not pair numbers that have been set to subunits 76 are the same. Then, when the pair numbers of subunits 76 are the same, the CPU 10 proceeds the processing to the next step 87. On the other hand, when the pair numbers of all the subunits 76 are different from each other, the CPU 10 proceeds the processing to the next step 89.

At step 87, the CPU 10 refers to the unit pair table data Dc, and changes, to Null, the pair number of the subunit 76 that is not subjected to the processes at steps 84 and 85 (i.e. the subunit 76 whose pair number has not been changed), among the subunits 76 whose pair numbers are the same, and proceeds the processing to the next step.

Next, the CPU 10 transmits pair display data indicating that the pair number is Null, to the subunit 76 whose pair number is changed to Null at step 87 (step 88), and proceeds the processing to the next step 89. Upon receipt of the pair display data that is transmitted by the process at step 88, the subunit 76 that has received the pair display data knows that the subunit 76 does not belong to any pair, and indicates that the subunit 76 does not belong to any pair by using the LEDs 762 (e.g. puts out all the LEDs 762).

At step 89, the CPU 10 determines whether or not to end the pair change process and to execute a game process. The game process is to be executed, for example, when the player has performed an operation for ending the pair change process, or when, in the case where the game process is being executed prior to execution of the pair change process at step 43, it has been determined at step 81 that the pair change process is not to be executed. Then, when continuing the pair change process, the CPU 10 returns to step 81 to repeat the processing. On the other hand, when executing the game process, the CPU 10 ends the processing of this subroutine.

Referring back to FIG. 21, after the pair change process at step 43, the CPU 10 executes the game process (step 44), and proceeds the processing to the next step. Here, at step 44, the game process is executed based on operation information outputted typically from the controller 7, specifically from the core unit 70 and the subunit 76. Then, the CPU 10 executes the game process on the assumption that each pair of a core unit 70 and a subunit 76 that have the same pair number that is described in the unit pair table data Dc are operated by the same player. In other words, the CPU 10 processes operation information based on a combination of a core unit 70 and a subunit 76 that are described in the unit pair table data Dc.

Next, the CPU 10 determines whether or not to end the game process (step 45). The game process is to be ended, for example, when conditions to make the game over are satisfied, or when the player has performed an operation for ending the game. When not ending the game, the CPU 10 returns to step 43 to repeat the processing. On the other hand, when ending the game, the CPU 10 ends the processing of the flow chart.

As described above, in the game system according to the present embodiment, each unit is provided with a display section for identifying a combination of a core unit 70 and a subunit 76 that are completely separated from each other. The combination of the core unit 70 and the subunit 76 is appropriately displayed on the display section, and thus it is possible to identify the combination of the core unit 70 and the subunit 76 when a controller 7 including the core unit 70 and the subunit 76 is used. In the game system according to the present embodiment, it is possible to change a unit combination such that a core unit 70 and a subunit 76 that are used by the same player belong to the same pair. For example, when a player performs an operation by using a core unit 70 and a subunit 76 that belong to different pairs, it is possible to change a combination such that the core unit 70 and the subunit 76 belong to the same pair, by performing a pair change operation using the core unit 70 and the subunit 76. Thus, even when a player performs an operation by using a core unit 70 and a subunit 76 that belong to different pairs, it becomes possible for the player to perform an intended operation, by performing a pair change operation.

The above has described the example where the player performs the pair change operation by temporarily connecting (contacting) the connector 73 of the core unit 70 to the connector 763 of the subunit 76. However, the pair change operation may be performed by other methods. Here, the pair change operation is an operation for detecting that the core unit 70 and the subunit 76 are operated by the same player, and is normally a predetermined operation that is assumed to be performed by the same player. For example, as described above, the pair change operation is performed by the same player holding the core unit 70 and the subunit 76 with left and right hands, respectively, and temporarily connecting (contacting) them to each other. Thus, theses actions are considered as an operation performed by the same player, and it is possible to change settings such that the core unit 70 and the subunit 76 currently held by the player are paired to be used in a game, by a simple operation.

As a first example of the pair change operation, the pair change operation is performed by a player operating a predetermined operation button provided in a core unit 70 and a predetermined operation button provided in a subunit 76. For example, buttons that are provided in the core unit 70 and the subunit 76, respectively, so as to be prevented from being accidentally pressed by a player (e.g. operation buttons that are provided in the core unit 70 and the subunit 76, respectively, for example, adjacent to the battery cases thereof) are set to operation buttons for the pair change operation. When the operation button, for the pair change operation, of the core unit 70 or the subunit 76 is pressed, operation data indicating that the operation button has been pressed is transmitted to the game apparatus body 5 together with the ID number of the unit. The pair change operation is performed by the player pressing the operation button, for the pair change operation, of the other of the core unit 70 and the subunit 76 (e.g. the subunit 76) within a predetermined time period after pressing the operation button, for the pair change operation, of one of the core unit 70 or the subunit 76 (e.g. the core unit 70). In this case, at the above step 81 (FIG. 23), the CPU 10 determines to execute the pair change process, by detecting that the operation button, for the pair change operation, of one of the core unit 70 and the subunit 76 has been operated. Then, the CPU 10 recognizes a combination of the core unit 70 and the subunit 76 (a combination of ID numbers), with respect to which the pair change operation has been performed, by detecting that the operation button, for the pair change operation, of the other of the core unit 70 and the subunit 76 has been operated, within a predetermined time period after detecting that the operation button, for the pair change operation, of the one of the core unit 70 or the subunit 76 has been operated. As described above, in the first example of the pair change operation, an operation of pressing the operation buttons for the pair change operation within a predetermined time period needs to be performed, and hence can be considered as an operation that is performed by the same player for the purpose of changing a combination.

As a second example of the pair change operation, the pair change operation is performed when: it is detected that the distance between a core unit 70 and a subunit 76 is within a predetermined distance, by using a near-field wireless communication technology such as a communication technology of RFID (Radio Frequency Identification); and a combination of the core unit 70 and the subunit 76, the distance between which is within the predetermined distance, is different from any combinations that are set in the game apparatus body 5. For example, an NFC (Near Field Communication) chip is provided in each of the core unit 70 and the subunit 76, and wireless communication for exchanging ID numbers (the ID numbers of the core unit 70 and the subunit 76) is performed between the NFC chips when near-field wireless communication is enabled between the NFC chips. Then, when the near-field wireless communication is established between the NFC chips, operation data indicating that the near-field wireless communication has been established is transmitted from each of the core unit 70 and the subunit 76 to the game apparatus body 5 together with the ID number of the unit and the ID number of the communication partner that is obtained by the near-field wireless communication. In this case, the CPU 10 receives, from the core unit 70 or the subunit 76, the operation data indicating that the near-field wireless communication has been established. When the combination of the core unit 70 and the subunit 76, between which the near-field wireless communication has been established, is different from any already-set combinations, the CPU 10 determines, at the above step 81 (FIG. 23), to execute the pair change process. Then, the CPU 10 recognizes the combination of the core unit 70 and the subunit 76 (the combination of the ID numbers), with respect to which the pair change operation has been performed, by using the received operation data indicating that the near-field wireless communication has been established. As described above, in the second example of the pair change operation, the pair change operation is performed by the same player: holding the core unit 70 and the subunit 76 with left and right hands, respectively; and causing them to approach each other, and hence can be considered as an operation that is performed by the same player, and it is possible to change settings such that the core unit 70 and the subunit 76 currently held by the player are paired to be used in a game, by a simple operation.

As a third example of the pair change operation, the pair change operation is performed when: it is detected that human body communication is enabled between a core unit 70 and a subunit 76; and a combination of the core unit 70 and the subunit 76, between which human body communication is enabled, is different from any combinations that are set in the game apparatus body 5. As an example, at a part of the body of each of the core unit 70 and the subunit 76, an electric conductor that is contactable with a hand of the player holding the unit is exposed, and change of current in the body of the player holding the core unit 70 and the subunit 76 is used to perform human body communication between the electric conductors. As another example, at a part of the body of each of the core unit 70 and the subunit 76, an electric conductor is provided so as to face a hand of the player holding the unit, via a predetermined insulator, and change of electric field on the surface of the player holding the core unit 70 and the subunit 76 is used to perform human body communication between the electric conductors. When communication is enabled with another unit via the electric conductors (i.e. human body communication is enabled between the units), human body communication for exchanging ID numbers (the ID numbers of the core unit 70 and the subunit 76) is performed between the units. Then, when the above human body communication has been established, operation data indicating that the human body communication has been established is transmitted from each of the core unit 70 and the subunit 76 to the game apparatus body 5 together with the ID number of the unit and the ID number of the communication partner that is obtained by the human body communication. In this case, the CPU 10 receives, from the core unit 70 or the subunit 76, the operation data indicating that the human body communication has been established, and determines, at the above step 81 (FIG. 23), to execute the pair change process when the combination of the core unit 70 and the subunit 76, between which the human body communication has been established, is different from any already-set combinations. Then, the CPU 10 recognizes the combination of the core unit 70 and the subunit 76 (the pair of ID numbers), with respect to which the pair change operation has been performed, by using the received operation data indicating that the human body communication has been established. As described above, in the third example of the pair change operation, the pair change operation is performed by the same player holding the core unit 70 and the subunit 76 with left and right hands, respectively. Thus, the pair change operation can be considered as an operation that is performed by the same player, and it is possible to play a game using the core unit 70 and the subunit 76, only by the player holding the core unit 70 and the subunit 76 for the game.

Figure 24:
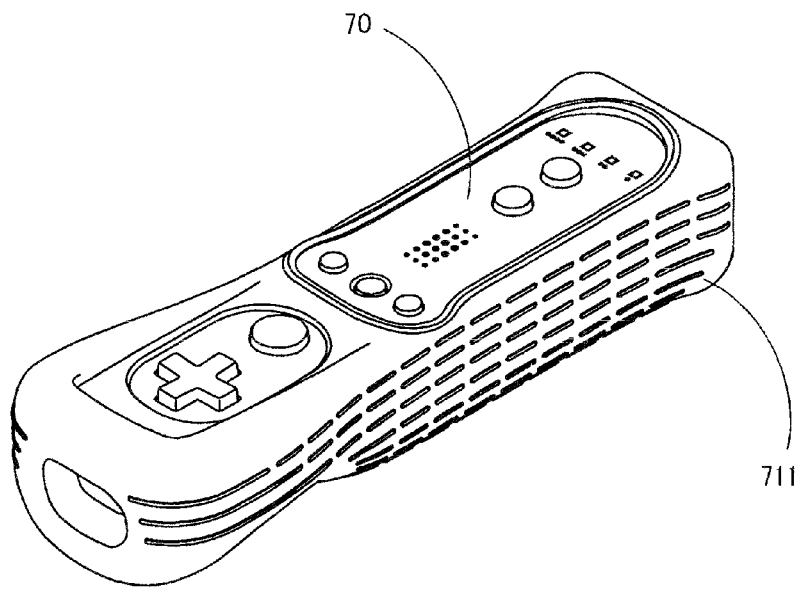
FIG. 24 is a perspective view showing an example of the core unit 70 covered with an electrically-conductive cushioning material (member 711)

In the third example, the human body communication is thought to be impossible when a member is mounted to each of the core unit 70 and the subunit 76 so as to surround the body thereof. For example, for making it easy to hold the core unit 70 and the subunit 76 and for absorbing the shock at falling or at collision against another member, the body of each of the core unit 70 and the subunit 76 may be covered with a non-conductive member such as silicon rubber. However, as shown in FIG. 24, the unit body is covered with a member 711 (e.g. electric-conductive silicon rubber) as an electric-conductive cushioning material, instead of the above non-conductive member, whereby a hand of the player contacts the electric conductor via the member 711 or a hand of the player faces the electric conductor via the member 711 and a predetermined insulator. Thus, even when the core unit 70 and the subunit 76 both covered with members 711 are used, the pair change operation by the aforementioned human body communication can be achieved. As described above, according to setting of a combination by using human body communication, the basic premise that the player holds the core unit 70 and the subunit 76 for playing a game is used, and it is possible to set a combination of the core unit 70 and the subunit 76 as a combination to be used in a game, only by the player freely holding the core unit 70 and the subunit 76 without performing a particular instruction.

Further, in the case of the third example of the pair change operation, it is possible to perform the pair change operation by causing the core unit 70 and the subunit 76 to directly contact each other. For example, when the electric conductor is provided in each of the core unit 70 and the subunit 76 so as to be exposed, it is possible to perform the pair change operation by causing the electric conductors to contact each other. Further, when the electric conductor is provided in each of the core unit 70 and the subunit 76 via a predetermined insulator, it is also possible to perform the pair change operation by causing the core unit 70 and the subunit 76 to contact each other so as to cause the electric conductors to face each other. In addition, when each of the bodies of the core unit 70 and the subunit 76 is covered with the electric-conductive member 711, it is also possible to perform the pair change operation by causing the members 711 to contact each other.

Second Embodiment

The following will describe a game system, according to a second embodiment, including an apparatus for executing a game program. The game system according to the second embodiment differs from the game system according to the aforementioned first embodiment only in a later-described communication system including a plurality of controllers 7 and a game apparatus body 5, and its other configuration is the same as that of the first embodiment. For example, the same display form of a combination of a core unit 70 and a subunit 76 as in the first embodiment may be used. Thus, in the second embodiment, the same components as those of the above first embodiment are designated by the same reference characters, and the detailed description thereof will be omitted.

Figures 25, 26:
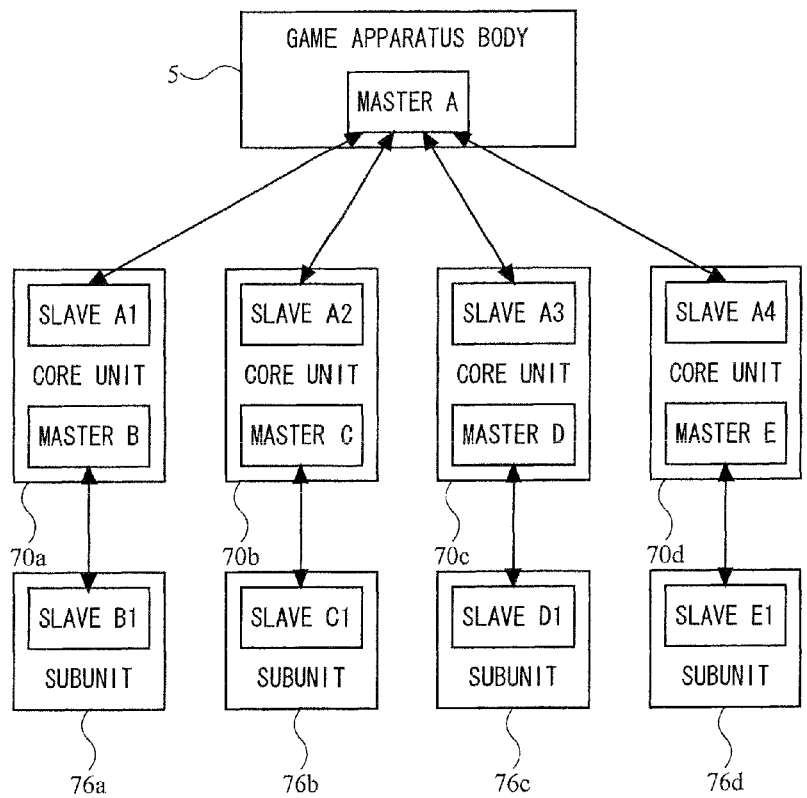
FIG. 25 is a block diagram showing another example of the communication system including a plurality of controllers 7 and a game apparatus body 5.
FIG. 26 shows another example of the unit pair table stored in the unit pair table data Dc in FIG. 19.

With reference to FIG. 25, an example of a communication system including a plurality of controllers 7 and a game apparatus body 5 in the second embodiment will be described. In the example shown in FIG. 25, a communication system includes: four controllers 7 each composed of a pair of a core unit 70 and a subunit 76; and a game apparatus body 5. For distinguishing the four pairs of the core units 70 and the subunits 76 from each other, the core units are designated by 70*a*, 70*b*, 70*c* and 70*d*, and the subunits are designated by 76*a*, 76*b*, 76*c* and 76*d*. In the following description, each component of the core units 70*a*, 70*b*, 70*c*, and 70*d* and each component of the subunits 76*a*, 76*b*, 76*c*, and 76*d* are designated by the corresponding reference numerals with a to d.

In the example of the communication system shown in FIG. 25, direct wireless communication is performed between the core units 70 and the subunits 76. Then, the game apparatus body 5 performs wireless communication only with the core units 70, and does not perform direct wireless communication with the subunits 76. For the wireless communication between the game apparatus body 5 and the core units 70, the game apparatus body 5 is a master device in the communication system, and the core units 70 are slave devices in the communication system. Then, for the wireless communication between the core units 70 and the subunits 76, the core units 70 are master devices in the communication system, and the subunits 76 are slave devices in the communication system. Specifically, in the communication system between the game apparatus body 5 and the core units 70, the game apparatus body 5 constitutes a master device (master A), and the core units 70*a*, 70*b*, 70*c*, and 70*d* become slave devices (slaves A1, A2, A3, and A4) corresponding to the master device (master A). Further, in the communication system between the core units 70 and the subunits 76, the core units 70*a*, 70*b*, 70*c*, and 70*d* constitute master devices (masters B to E), and the subunits 76*a*, 76*b*, 76*c*, and 76*d* become slave (slaves B1, C1, D1, and E1) devices corresponding to the master devices (masters B to E), respectively.

The master device (master A) constituted by the game apparatus body 5 forms a Piconet with the corresponding slave devices (slaves A1 to A4), and performs communication with the corresponding slave devices (slaves A1 to A4). The master devices (masters B to E) constituted by the core units 70*a*, 70*b*, 70*c*, and 70*d*, respectively, form Piconets with the corresponding slave devices (slaves B1, C1, D1, and E1), and perform communication with the corresponding slave devices (slaves B1, C1, D1, and E1), respectively. In other words, the core units 70*a* to 70*d* perform communication with the subunits 76*a* 76*d*, respectively, and perform communication with the game apparatus body 5.

When the communication system shown in FIG. 25 is used, sub key data from the operation section 78 provided in each subunit 76, sub acceleration data from the acceleration sensor 761 provided in each subunit 76, and the ID number of each subunit 76 are modulated as a series of sub operation information into a weak radio signal at the wireless module 767, and radiated from each subunit 76. The wireless module 753 of each core unit 70 receives the weak radio signal from each subunit 76, and each core unit 70 demodulates or decodes the weak radio signal, and stores once the series of sub operation information (the sub key data, the sub acceleration data, and the ID number of each subunit 76) in the memory 752. Then, at a timing of transmission to the wireless controller module 19, the microcomputer 751 outputs, to the wireless module 753, the transmission data stored in the memory 752, together with the ID number of the core unit 70 and the ID number of the subunit 76 paired with the core unit 70, as a series of core operation information and sub operation information. Based on, for example, the Bluetooth (registered trademark) technology, the wireless module 753 modulates a carrier wave of a predetermined frequency with the core operation information and the sub operation data, and radiates the resultant weak radio signal from the antenna 754 to the game apparatus body 5. The wireless controller module 19 of the game apparatus body 5 receives the weak radio signal, and the game apparatus body 5 demodulates or decodes the weak radio signal to obtain the series of core operation information (core key data, core acceleration data, and processing result data) and the sub operation information (the sub key data and the sub acceleration data) together with the ID number of the core unit 70, which is the transmission source, and the ID number of the subunit 76 paired with the core unit 70. The CPU 10 of the game apparatus body 5 performs game processing based on the obtained core operation information and sub operation information and a game program.

Further, when the connector 73 of a core unit 70 is connected to the connector 763 of a subunit 76 by a player performing a pair change operation, the communication section 75 of the core unit 70 establishes a pairing with the subunit 76 for wireless communication, and obtains the ID number of the subunit 76 from the connected subunit 76 via the connector 73. Although described later, when the connector 73 is connected to the connector 763 of the subunit 76, the communication section 75 transmits, to the game apparatus body 5, contact data indicating that the pair change operation has been performed, together with the ID number of the core unit 70 and the obtained ID number (pair ID number) of the subunit 76.

Further, the communication section 75 of the core unit 70 transmits, to the paired subunit 76, pair display data for lighting up, in accordance with a pair number instructed from the game apparatus body 5, one of LEDs corresponding to the pair number. The subunit 76 lights up one of a plurality of LEDs 762 in accordance with the pair display data transmitted from the core unit 70.

The following will describe main data used in game processing executed by the game apparatus body 5 in the second embodiment. The data used in the second embodiment differs from that in the aforementioned first embodiment only in unit pair table data Dc, and the other data is the same as in the first embodiment and hence the detailed description thereof will be omitted.

Referring to FIG. 26, data indicative of a unit pair table for administrating currently set combinations of core units 70 and subunits 76 is stored in the unit pair table data Dc in the second embodiment. For example, in the unit pair table, the ID number, the slave number and the pair number of each of core units 70 with which the game apparatus body 5 is communicable; the ID number (hereinafter, may be referred to as pair ID number) of each of subunits 76 that has established a pairing with a core unit 70 for wireless communication; and the like are described.

For example, in the unit pair table data Dc described are: the ID number, a slave number, the pair number, and the pair ID number of each of the core units 70 (slaves A), with which the master device (master A) of the game apparatus body 5 communicates. Specifically, the slave number "A1", the slave number "A1", and the pair number "1" are described for the core unit 70 with the ID number "AXXXXXX".

Figure 27:
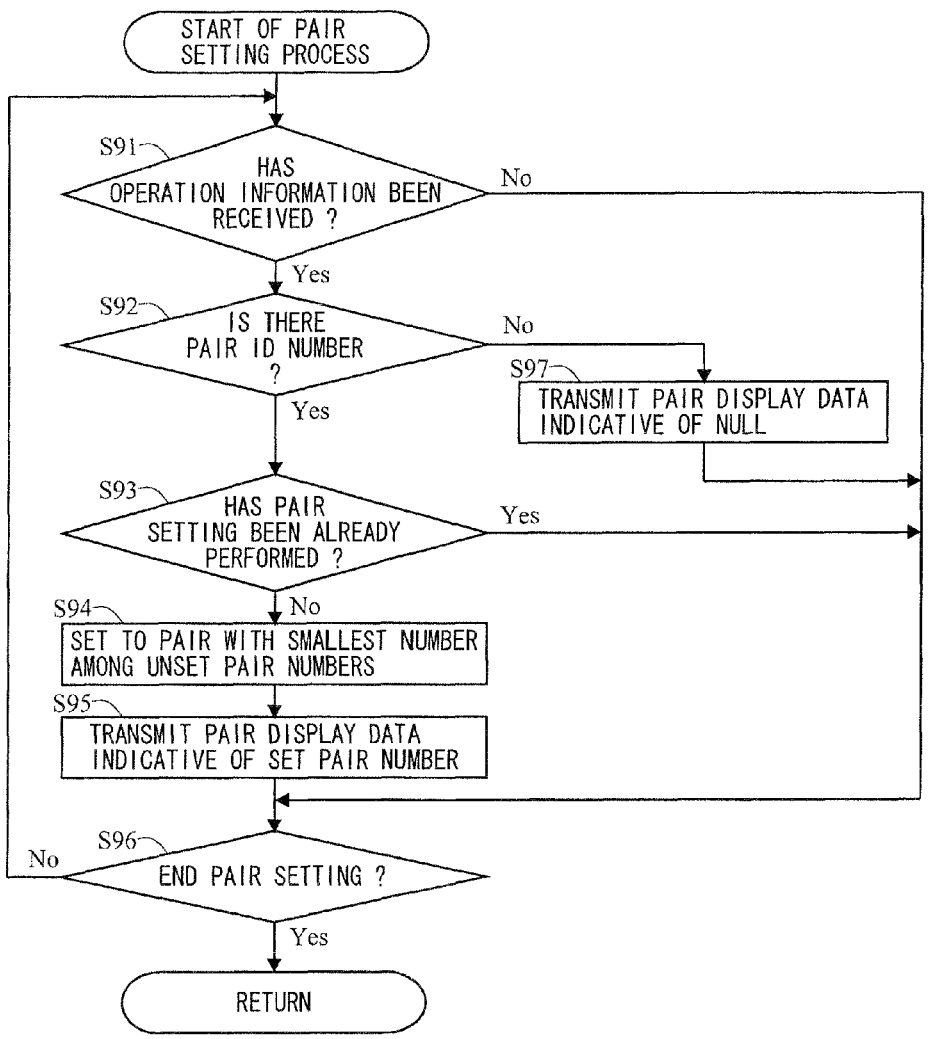
FIG. 27 is a subroutine showing another example of detailed operations of the pair setting process at step 42 in FIG. 21.

The following will describe in detail processing executed by the game apparatus body 5 in the second embodiment. The processing in the second embodiment differs from that in the aforementioned first embodiment in operations of the pair setting process and the pair change process, and the flow chart (FIG. 21) showing the entire procedure of the processing is the same therebetween. Thus, operations of a pair setting process and a pair change process in the second embodiment will be described below. FIG. 27 is a subroutine showing an example of detailed operations of the pair setting process, in the second embodiment, at step 42 in FIG. 21. FIG. 28 is a subroutine showing an example of detailed operations of the pair change process, in the second embodiment, at step 43 in FIG. 21. In FIGS. 27 and 28, each step executed by the CPU 10 is abbreviated to "S".

Referring to FIG. 27, the CPU 10 determines whether or not operation information has been received from any one of the core units 70 (step 91). Then, when having received operation information any one of the core units 70, the CPU 10 updates core operation data Da1 and sub operation data Da2 with the operation information based on the transmitted ID number and pair ID number, and proceeds the processing to the next step 92. On the other hand, when not having received operation information from any core unit 70, the CPU 10 proceeds the processing to the next step 96.

At step 92, the CPU 10 determines whether or not the operation information that is received at step 91 contains a pair ID number. Then, when the received operation information contains a pair ID number, the CPU 10 determines that the core unit 70 that has transmitted the operation information has established a paring with a subunit 76 for wireless communication, and proceeds the processing to the next step 93. On the other hand, when the received operation information does not contain any pair ID number, the CPU 10 determines that the core unit 70 that has transmitted the operation information has not established a pairing with any subunit 76 for wireless communication, and proceeds the processing to the next step 97.

At step 93, the CPU 10 determines whether or not the core unit 70 that has transmitted the operation information has been already set to belong any pair. For example, the CPU 10 refers to the unit pair table data Dc, and determines whether or not the transmitted ID number corresponding to the core unit 70 has been already described therein. When the transmitted ID number has been already described, the core unit 70 of the ID number is determined to have been already set to belong to any pair. Then, when the core unit 70 that has transmitted the operation information has not been set to belong to any pair, the CPU 10 proceeds the processing to the next step 94. On the other hand, when the core unit 70 that has transmitted the operation information has been already set to belong to any pair, the CPU 10 proceeds the processing to the next step 96.

At step 94, the CPU 10 sets the core unit 70 that has transmitted the operation information, to belong to the pair with the smallest number among unset pair numbers, and proceeds the processing to the next step. For example, the CPU 10 refers to the unit pair table data Dc, and assigns the core unit 70 that has transmitted the operation information, to the smallest unset pair number. Then, the CPU 10 describes, at the smallest pair number, the ID number of the core unit 70 that has transmitted the operation information; and the pair ID number contained in the operation information, and assigns an appropriate slave number to the core unit 70. Specifically, in the unit pair table data Dc shown in FIG. 26, the pair number "1" for a core unit 70 is assigned to the core unit 70 with the ID number "AXXXXXX" and the subunit 76 with the pair ID number "axxxxxx", and the slave number "A1" is assigned to the core unit 70.

Next, the CPU 10 transmits, to the core unit 70 that has transmitted the operation information, pair display data indicative of the pair number that is set at step 94 (step 95), and proceeds the processing to the next step 96. Upon receipt of the pair display data that is transmitted by the process at step 94, the core unit 70 that has transmitted the operation information knows the pair number thereof, and lights up one of the LEDs 702 in accordance with the pair number. Further, the core unit 70 that has transmitted the pair display data transmits pair display data indicative of the pair number that is set at step 94, to the subunit 76 that has established a paring with the core unit 70 for wireless communication. Then, the subunit 76 that has received the pair display data transmitted from the core unit 70 knows the pair number thereof, and lights up one of the LEDs 762 in accordance with the pair number.

On the other hand, when it is determined at step 92 that the received operation information does not contain any pair ID number, the CPU 10 transmits pair display data indicating that the pair number is Null, to the core unit 70 that has transmitted the operation information at step 91 (step 97), and proceeds the processing to the next step 96. Here, when the operation information transmitted from the core unit 70 does not contain any pair ID number, it is thought that the core unit 70 that has transmitted the operation information has not established a pairing with any subunit 76 for wireless communication. Thus, upon receipt of the pair display data that is transmitted by the process at step 97, the core unit 70 that has received the pair display data knows that the core unit 70 has not established a pairing for wireless communication and does not belong to any pair, and indicates that the core unit 70 does not belong to any pair, by using the LEDs 702 (e.g. puts out all the LEDs 702).

At step 96, the CPU 10 determines whether or not to end the pair setting process for the core unit 70 and the subunit 76. The pair setting process is to be ended, for example, when the player has performed an operation for ending the pair setting process, or when predetermined conditions to end the pair setting process are satisfied (e.g. a predetermined time period has elapsed after the pair setting process is started). Then, when continuing the pair setting process, the CPU 10 returns to step 91 to repeat the processing. On the other hand, when ending the pair setting process, the CPU 10 ends the processing of this subroutine.

Referring to FIG. 28, the CPU 10 determines whether or not to execute a pair change process (step 101). For example, when having received contact data from the core unit 70 by the player performing a pair change operation of connecting a connector 73 to a connector 763 using a core unit 70 and a subunit 76, the CPU 10 determines to execute the pair change process. Various other methods are considered as a method for the CPU 10 to determine whether or not to execute the pair change process, and other methods will be descried later. Then, when executing the pair change process, the CPU 10 proceeds the processing to the next step 102. On the other hand, when not executing the pair change process, the CPU 10 proceeds the processing to the next step 108.

At step 102, the CPU 10 obtains contact data from the core unit 70 with respect to which the pair change operation has been performed, and proceeds the processing to the next step. For example, the CPU 10 updates contact data Da3 with the contact data based on the ID number of the transmission source of the received contact data.

Next, the CPU 10 refers to the contact data that is obtained at step 102, and determines whether or not the core unit 70 and the subunit 76, with respect to which the pair change operation has been performed, belong to the same pair number (step 103). For example, the CPU 10 refers to the unit pair table data Dc and the contact data that is obtained at step 102, and determines whether or not the ID number of the transmission source of the contact data and the pair ID number indicated by the contact data belong to the same pair number. Then, when the core unit 70 and the subunit 76, with respect to which the pair change operation has been performed, belong to different pair numbers, or when at least one of the core unit 70 and the subunit 76 does not belong to any pair, the CPU 10 proceeds the processing to the next step 104. On the other hand, when the core unit 70 and the subunit 76, with respect to which the pair change operation has been performed, belong to the same pair number, the CPU 10 proceeds the processing to the next step 108.

At step 104, the CPU 10 changes the pair number such that the core unit 70 and the subunit 76, with respect to which the pair change operation has been performed, belong to the same pair number, and proceeds the processing to the next step. For example, the CPU 10 refers to the unit pair table data Dc, and changes the pair ID number corresponding to the ID number (i.e. the ID number of the core unit 70 that has transmitted the contact data) of the transmission source of the contact data that is obtained at step 102, to the pair ID number contained in the contact data. By the process at step 104, the core unit 70 and the subunit 76, with respect to which the pair change process has been performed, are changed to have the same pair number in the unit pair table data Dc.

Next, the CPU 10 transmits, to the core unit 70 with respect to which the pair change operation has been performed, pair display data indicative of the pair number that is set at step 104 (step 105), and proceeds the processing to the next step. Upon receipt of the pair display data that is transmitted by the process at step 105, the core unit 70 that has received the pair display data knows the pair number thereof, and lights up one of the LEDs 702 in accordance with the pair number. Further, the core unit 70 that has received the pair display data transmits, to the subunit 76 with which the core unit 70 has established a paring for wireless communication, the pair display data indicative of the pair number that is set at step 105. Then, the subunit 76 that has received the pair display data that is transmitted from the core unit 70 knows that the pair number thereof has been changed, and lights up one of the LEDs 762 in accordance with the changed pair number.

Here, the core unit 70, with respect to which the pair change operation has been performed, is thought to have established a paring with another subunit 76 for wireless communication prior to the pair change operation. However, the core unit 70, with respect to which the pair change operation has been performed, establishes a paring with a new subunit 76 for wireless communication by the pair change operation, and cancels the paring that has been established prior to the pair change operation (cancels slave registration). Thus, the subunit 76 that has been paired with the core unit 70 prior to the pair change operation recognizes that the subunit 76 does not belong to any pair by cancellation of the slave registration with the core unit 70 due to the pair change operation, and indicates that the subunit 76 does not belong to any pair, by using the LEDs 762 (e.g. puts out all the LEDs 762).

Next, the CPU 10 determines whether or not there are pair ID numbers that become the same due to the process at step 104 (step 106). For example, the CPU 10 refers to the unit pair table data Dc, and determines whether or not there are pair ID numbers that are the same. Then, when there are pair ID numbers that are the same, the CPU 10 proceeds the processing to the next step 107. On the other hand, when all the pair ID numbers are different from each other, the CPU 10 proceeds the processing to the next step 108.

At step 107, the CPU 10 refers to the unit pair table data Dc, deletes the pair ID number at the pair number (i.e. the pair number at which the pair ID number has not been changed) that is not subjected to the processes at steps 104 and 105, among the pair ID numbers that are the same, and proceeds the processing to the next step 108.

At step 108, the CPU 10 determines whether or not to end the pair change process and to execute a game process. The game process is to be executed, for example, when the player has performed an operation for ending the pair change process, or when, in the case where the game process is being executed prior to execution of the pair change process at step 43, it has been determined at step 101 that the pair change process is not to be executed. Then, when continuing the pair change process, the CPU 10 returns to step 101 to repeat the processing. On the other hand, when executing the game process, the CPU 10 ends the processing of this subroutine.

As described above, in the game system according to the second embodiment, each unit is provided with a display section for identifying a combination of a core unit 70 and a subunit 76 that are completely separated from each other. The combination of the core unit 70 and the subunit 76 is appropriately displayed on the display section, and thus it is possible to identify the combination of the core unit 70 and the subunit 76 when a controller 7 including the core unit 70 and the subunit 76 is used. In the game system according to the second embodiment, it is possible to change a unit combination such that a core unit 70 and a subunit 76 that are used by the same player belong to the same pair. For example, when a player performs an operation by using a core unit 70 and a subunit 76 that belong to different pairs, it is possible to change a combination such that the core unit 70 and the subunit 76 belong to the same pair, by performing a pair change operation using the core unit 70 and the subunit 76. Thus, even when a player performs an operation by using a core unit 70 and a subunit 76 that belong to different pairs, it becomes possible for the player to perform an intended operation, by performing a pair change operation.

The above second embodiment has described the example where the player performs the pair change operation by temporarily connecting (contacting) the connector 73 of the core unit 70 to the connector 763 of the subunit 76. However, the pair change operation may be performed by other methods in the second embodiment as long as a paring between the core unit 70 and the subunit 76 for wireless communication is possible in the other methods.

As a first example of the pair change operation, the pair change operation is performed by a player operating a predetermined operation button provided in a core unit 70 and a predetermined operation button provided in a subunit 76. For example, similarly as in the first embodiment, an operation button for the pair change operation is set in each of the core unit 70 and the subunit 76. A pair change operation is performed by pressing the operation button, for the pair change operation, of the other of the core unit 70 and the subunit 76 within a predetermined a time period after pressing the operation button, for the pair change operation, of one of the core unit 70 and the subunit 76. At this time, a pairing between the core unit 70 and the subunit 76, whose operation buttons for the pair change operation has been pressed, is established for wireless communication, and the wireless communication therebetween becomes possible. The ID number (pair ID number) of the subunit 76, for which the pairing has been established, is transmitted from the subunit 76 to the core unit 70 for which the pairing has been established. The core unit 70 that has obtained the pair ID number transmits, to the game apparatus body 5, operation data indicating that the operation button for the pair change operation has been pressed (or data indicating that a new pairing has been established), together with the ID number and the pair ID number of the core unit 70. In this case, at the above step 101 (FIG. 28), the CPU 10 determines to execute the pair change process, by detecting that the operation button, for the pair change operation, of the core unit 70 has been operated. Then, the CPU 10 recognizes a combination of the core unit 70 and the subunit 76 (a combination of ID numbers), with respect to which the pair change operation has been performed, by detecting that the operation button, for the pair change operation, of the core unit 70 has been operated.

As a second example of the pair change operation, the pair change operation is performed when: it is detected that the distance between a core unit 70 and a subunit 76 is within a predetermined distance, by using a near-field wireless communication technology such as a communication technology of RFID; and a combination of the core unit 70 and the subunit 76, the distance between which is within the predetermined distance, is different from any combinations that are set in the game apparatus body 5. For example, an NFC chip is provided in each of the core unit 70 and the subunit 76, and wireless communication for exchanging ID numbers (the ID numbers of the core unit 70 and the subunit 76) is performed between the NFC chips when near-field wireless communication is enabled between the NFC chips. At this time, a pairing between the core unit 70 and the subunit 76, in which the near-field wireless communication has been established between the NFC chips, is established for wireless communication, and the wireless communication therebetween becomes possible. Then, when the near-field wireless communication is established between the NFC chips, operation data indicating that the near-field wireless communication has been established is transmitted from the core unit 70 to the game apparatus body 5 together with the ID number of the core unit 70 and the ID number of the subunit 76 that is obtained by the near-field wireless communication. In this case, the CPU 10 receives, from the core unit 70, the operation data indicating that the near-field wireless communication has been established. When a combination of the core unit 70 and the subunit 76, between which the near-field wireless communication has been established, is different from any already-set combinations, the CPU 10 determines, at the above step 101 (FIG. 28), to execute the pair change process. Then, the CPU 10 recognizes the combination of the core unit 70 and the subunit 76 (the combination of the ID numbers) by using the received operation data indicating that the near-field wireless communication has been established.

As a third example of the pair change operation, the pair change operation is performed when: it is detected that human body communication is enabled between a core unit 70 and a subunit 76; and a combination of the core unit 70 and the subunit 76, between which the human body communication is enabled, is different from any combinations that are set in the game apparatus body 5. As an example, at a part of the body of each of the core unit 70 and the subunit 76, an electric conductor that is contactable with a hand of the player holding the unit is exposed, and change of current in the body of the player holding the core unit 70 and the subunit 76 is used to perform human body communication between the electric conductors. As another example, at a part of the body of each of the core unit 70 and the subunit 76, an electric conductor is provided so as to face a hand of the player holding the unit, via a predetermined insulator, and change of electric field on the surface of the player holding the core unit 70 and the subunit 76 is used to perform human body communication between the electric conductors. When communication is enabled with another unit via the electric conductors (i.e. human body communication is enabled between the units), human body communication for exchanging ID numbers (the ID numbers of the core unit 70 and the subunit 76) is performed between the units. At this time, a pairing between the core unit 70 and the subunit 76, between which the human body communication has been established, is established for wireless communication, and the wireless communication therebetween becomes possible. Then, when the above human body communication has been established, operation data indicating that the human body communication has been established is transmitted from the core unit 70 to the game apparatus body 5 together with the ID numbers of the core unit 70 and the subunit 76 between which the human body communication has been established. In this case, the CPU 10 receives, from the core unit 70, the operation data indicating that the human body communication has been established, and determines, at the above step 101 (FIG. 28), to execute the pair change process when the combination of the core unit 70 and the subunit 76, between which the human body communication has been established, is different from any already-set combinations. Then, the CPU 10 recognizes the combination of the core unit 70 and the subunit 76 (the combination of ID numbers), with respect to which the pair change operation has been performed, by using the received operation data indicating that the human body communication has been established.

Further, in the third example of the pair change operation, it is also possible to perform the pair change operation by causing the core unit 70 and the subunit 76 to directly contact each other. For example, when the electric conductor is provided in each of the core unit 70 and the subunit 76 so as to be exposed, it is possible to establish a pairing between the core unit 70 and the subunit 76 for wireless communication and to perform the pair change operation, by causing the electric conductors to contact each other. Further, when the electric conductor is provided in each of the core unit 70 and the subunit 76 via a predetermined insulator, it is also possible to establish a pairing between the core unit 70 and the subunit 76 for wireless communication and to perform the pair change operation, by causing the core unit 70 and the subunit 76 to contact each other so as to cause the electric conductors to face each other. In addition, when each of the bodies of the core unit 70 and the subunit 76 is covered with the electric-conductive member 711, it is also possible to establish a pairing between the core unit 70 and the subunit 76 for wireless communication and to perform the pair change operation, by causing the members 711 to contact each other.

In the above second embodiment, in any examples of the pair change operation, the game apparatus body 5 changes a combination of the core unit 70 and the subunit 76 based on operation data indicating that a pair change operation has been performed. However, a combination of the core unit 70 and the subunit 76 may be changed based on other data. For example, in the aforementioned examples of the pair change operation, a pairing between the core unit 70 and the subunit 76, with respect to which the pair change operation has been performed, is established for wireless communication. Thus, after the establishment of the pairing, operation information (core operation information and sub operation information) transmitted from the core unit 70 to the game apparatus body 5 contains the wireless communication partner (pair ID number) for which the paring has been established. Therefore, the game apparatus body 5 may observe the pair ID number in the operation information transmitted from the core unit 70, and when the pair ID number is changed, the game apparatus body 5 may determine that a pair change operation has been performed. In this case, based on the operation information transmitted from the core unit 70, the game apparatus body 5 changes a combination of the core unit 70 and the subunit 76.

Further, the above first embodiment and the above second embodiment have described the example where setting of the pair number of the core unit 70 is prioritized when pair numbers are changed. However, setting of the pair number of the subunit 76 may be prioritized. In this case, a combination of the core unit 70 and the subunit 76 is changed, the pair number of the core unit 70 is changed so as to be the same as the pair number of the subunit 76.

Further, in the second embodiment, the core unit 70 is set to a master device for wireless communication between the core unit 70 and the subunit 76. However, the subunit 76 may be set to a master device for the wireless communication. In this case, for the wireless communication between the core unit 70 and the subunit 76, the core unit 70 is set to a slave device. Further, the game apparatus body 5 performs wireless communication with the subunit 76, and the subunit 76 is set to a slave device for the wireless communication.

Further, in the above description, it is postulated that a plurality of players operates controllers 7 (core units 70 and subunits 76). However, it is understood that the present invention is realized even by an operation of a single player. Even in the case where a single player performs an operation, when there are a plurality of core units 70 or a plurality of subunits 76, it is possible to identify a combination of units to be used by the player, by a display for identifying a combination of a core unit 70 and a subunit 76, and it is possible to easily change the combination. Further, even when there are one core unit 70 and one subunit 76, it is possible for the player to determine whether or not pair setting for the core unit 70 and the subunit 76 is valid, by the display sections, and it is possible to easily perform pair setting when the pair setting for the core unit 70 and the subunit 76 is invalid.

Further, the above has described the example where the present embodiment is applied to a stationery game apparatus. However, the present embodiment is applicable to information processing apparatuses such as a common personal computer that is operated using a plurality of input devices.

It is understood that the shapes of the core unit 70 and the subunit 76; and the shapes, numbers, and installed positions of the operation sections 72 is merely an example, and the present invention can be realized with other shapes, numbers and installed positions. It is understood that the process order that is used in the above processing is merely an example, and the present invention can be realized with another process order.

Further, the game program of the present embodiment may be supplied to the game apparatus body 5 not only via an external storage medium such as the optical disc 4, but also via a wired or wireless communication path. Further, the game program may be prestored in a non-volatile storage device provided within the game apparatus body 5. It is noted that an information storage medium for storing the game program may be a CD-ROM, a DVD or other similar optical disc storage medium, or may be a non-volatile semiconductor memory.

A game system and a controller according to the present embodiment make it possible to identify a pair of units when the controller including the completely separate two units is used, and are useful as: a controller including two units, and the like; and a system including the controller, and the like. Further, a game system and a controller according to the present invention make it possible to change a combination of units when the controller including the completely separate two units is used, and are useful as: a controller including two units, and the like; and a system including the controller, and the like.

While the embodiment presented herein has been described in detail, the foregoing description is in all aspects illustrative and not restrictive. It is understood that numerous other modifications and variations can be devised without departing from the scope of the embodiment. It is understood that the scope of the present embodiment is determined only by the claims. It is understood that those skilled in the art can implement the present embodiment in the equivalent range based on the description of the present embodiment and common technical knowledge, from the description of the specific embodiments. It is understood that the contents of the patent, the patent application, and the document that are cited in the present specification are incorporated herein by reference, similarly as when the contents are specifically described in the present specification.

Further, it is understood that throughout the present specification, a singular form includes a concept of a plural form as long as no mention is made thereto. Thus, it is understood that an article or an adjective of a singular form (e.g. "a", "an", "the", and the like in the case of English) includes a concept of a plural form as long as no mention is made thereto. It is understood that terms used in the present specification each have a general meaning in the art as long as no mention is made thereto. Thus, unless defined particularly, all the technical terms used in the present specification have the same meanings as that understood generally by those skilled in the art to which the present embodiment pertains. When a term is in contradiction with its general meaning, the present specification (including definition) is prioritized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A game system in which a plurality of pairs, each consisting of:
    a first input device provided with a first operation section; and a second input device provided with a second operation section, are wirelessly connected to a game apparatus, and in which a game process is executed based on operation data obtained from the first input device and the second input device,
    each of the first input device and the second input device including:
        a wireless communication unit for wirelessly communicating the operation data and information regarding each pair; and
        a detection unit for detecting that a predetermined operation is performed by a user with respect to the first input device and the second input device,
    the game system comprising a control unit for controlling a combination of the first input device and the second input device in each pair in accordance with a detection result by the detection unit.

2. The game system according to claim 1, wherein
    each of the first input device and the second input device further includes an NFC chip, and
    each detection unit detects that near-field wireless communication is enabled between the NCF chip of the first input device and the NFC chip of the second input device.

3. The game system according to claim 1, wherein
    each of the first input device and the second input device further includes a human body communication unit for performing communication with another input device via the body of a user, and
    each detection unit detects that the first input device and the second input device are operated by the same user, by human body communication being enabled between the human body communication unit of the first input device and the human body communication unit of the second input device.

4. The game system according to claim 1, wherein the detection unit detects that predetermined operation buttons respectively provided in the first input device and the second input device are pressed within a predetermined time period.

5. The game system according to claim 1, wherein
    the wireless communication unit of the first input device wirelessly transmits, to the second input device that belongs to the same pair as the first input device, first operation data in accordance with an operation with respect to the first operation section, and
    the wireless communication unit of the second input device wirelessly transmits, to the game apparatus, second operation data in accordance with an operation with respect to the second operation section and information regarding the pair, together with the first operation data received from the first input device that belongs to the same pair as the second input device.

6. The game system according to claim 1, wherein
    the wireless communication unit of the first input device wirelessly transmits, to the game apparatus, first operation data in accordance with an operation with respect to the first operation section and information regarding the pair, and
    the wireless communication unit of the second input device wirelessly transmits, to the game apparatus, second operation data in accordance with an operation with respect to the second operation section and information regarding the pair.

7. The game system according to claim 1, wherein
    each of the first input device and the second input device further includes:
        a display section; and
        a display control section for controlling a display form of the display section,
        the display control section controls the display form of the display section so as to be a display form corresponding to the combination controlled by the control unit, and
        the game apparatus executes the game process based the operation data for each combination.

8. A controller comprising, as a pair, a first unit provided with a first operation section; and a second unit provided with a second operation section,
    the first unit including:
        a first wireless communication unit for wirelessly transmitting, to the second unit that belongs to the same pair as the first unit, first operation data in accordance with an operation with respect to the first operation section; and
        a first detection unit for detecting that a predetermined operation is performed by the same user with respect to the first unit and the second unit,
    the second unit including:
        a second wireless communication unit for wirelessly transmitting, to a game apparatus, second operation data in accordance with an operation with respect to the second operation section and information regarding the pair, together with the first operation data received from the first unit that belongs to the same pair as the second unit;
        a second detection unit for detecting that the predetermined operation is performed by the same user with respect to the first unit and the second unit; and
        a control unit for controlling a combination of the first unit and the second unit in the pair in accordance with at least a detection result by the second detection unit.

9. The controller according to claim 8, wherein
    each of the first unit and the second unit further includes:
        a display section; and
        a display control section for controlling a display form of the display section, and
        the display control section controls the display form of the display section so as to be a display form corresponding to the combination controlled by the control unit.

10. A controller comprising, as a pair, a first unit provided with a first operation section; and a second unit provided with a second operation section,
    the first unit including:
        a first wireless communication unit for wirelessly transmitting, to a game apparatus, first operation data in accordance with an operation with respect to the first operation section and information regarding the pair; and
        a first detection unit for detecting that a predetermined operation is performed by the same user with respect to the first unit and the second unit, the second unit including:
- a second wireless communication unit for wirelessly transmitting, to the game apparatus, second operation data in accordance with an operation with respect to the second operation section and information regarding the pair; and
- a second detection unit for detecting that the predetermined operation is performed by the same user with respect to the first unit and the second unit, at least one of the first wireless communication unit and the second wireless communication unit also wirelessly transmitting, to the game apparatus including a control unit for controlling a combination of the first unit and the second unit in the pair, a detection result that the predetermined operation is performed by the same user with respect to the first unit and the second unit.

11. The controller according to claim 10, wherein each of the first unit and the second unit further includes:
- a display section; and
- a display control section for controlling a display form of the display section, and the display control section controls the display form of the display section so as to be a display form corresponding to the combination controlled by the control unit.

* * * * *